(12) United States Patent
Mahlmeister et al.

(10) Patent No.: US 10,220,306 B2
(45) Date of Patent: *Mar. 5, 2019

(54) SYSTEM AND METHOD FOR OFFLINE CONFIGURING OF A GAMING ACCESSORY

(71) Applicant: STEELSERIES ApS, Frederiksberg (DK)

(72) Inventors: Jeffrey Nicholas Mahlmeister, Chicago, IL (US); Andrew Olcott, Seattle, WA (US)

(73) Assignee: STEELSERIES ApS, Frederiksberg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,323

(22) Filed: Feb. 26, 2018

(65) Prior Publication Data

US 2018/0178115 A1 Jun. 28, 2018

Related U.S. Application Data

(63) Continuation of application No. 15/629,069, filed on Jun. 21, 2017, now Pat. No. 9,931,565, which is a
(Continued)

(51) Int. Cl.
*A63F 13/22* (2014.01)
*A63F 13/285* (2014.01)
(Continued)

(52) U.S. Cl.
CPC .............. *A63F 13/22* (2014.09); *A63F 13/24* (2014.09); *A63F 13/285* (2014.09); *A63F 13/42* (2014.09);
(Continued)

(58) Field of Classification Search
USPC ............................................. 463/29, 30, 31
See application file for complete search history.

(56) References Cited

U.S. PATENT DOCUMENTS 6,071,194 A 6/2000 Sanderson
6,468,158 B1 10/2002 Ootori et al.
(Continued)

OTHER PUBLICATIONS

"Keyboard Technology," http://en.wikipedia.org/widi/Keyboard_technology#Membrane_keyboard, 7 pgs. 2014.
(Continued)

*Primary Examiner* — Pierre E Elisca
(74) *Attorney, Agent, or Firm* — Guntin & Gust, PLC; Mark Wilinski

(57) ABSTRACT

A peripheral device is configured to obtain configuration information from user equipment. The configuration information is for the peripheral device, wherein during receipt of the configuration information the peripheral device is not in communication with the user equipment. The configuration information is based on selections obtained via the user equipment and associated with operational parameters for the peripheral device. The configuration information is stored in a memory that is remote from the user equipment. Provisioning information is provided to the user equipment, wherein the provisioning information is associated with the configuration information and wherein the provisioning information enables configuration of the peripheral device with the operational parameters.

20 Claims, 21 Drawing Sheets

Related U.S. Application Data continuation of application No. 14/687,989, filed on Apr. 16, 2015, now Pat. No. 9,713,767.

(60) Provisional application No. 61/982,081, filed on Apr. 21, 2014.

(51) Int. Cl.

| | | |
|---|---|---|
| *A63F 13/24* | (2014.01) | |
| *A63F 13/42* | (2014.01) | |
| *G06F 1/16* | (2006.01) | |
| *G06F 3/023* | (2006.01) | |
| *G06F 3/0354* | (2013.01) | |
| *G06F 3/039* | (2013.01) | |
| *G06F 9/445* | (2018.01) | |
| *G06F 13/10* | (2006.01) | |
| *H01F 7/02* | (2006.01) | |
| *G06F 3/01* | (2006.01) | |
| *G06F 3/038* | (2013.01) | |
| *A63F 13/60* | (2014.01) | |
| *A63F 13/63* | (2014.01) | |

(52) U.S. Cl.
CPC ............ *G06F 1/1652* (2013.01); *G06F 3/016* (2013.01); *G06F 3/023* (2013.01); *G06F 3/038* (2013.01); *G06F 3/0395* (2013.01); *G06F 3/03543* (2013.01); *G06F 9/44505* (2013.01); *G06F 13/102* (2013.01); *H01F 7/0273* (2013.01); *A63F 13/60* (2014.09); *A63F 13/63* (2014.09); *A63F 2300/1018* (2013.01); *A63F 2300/208* (2013.01); *G06F 2203/013* (2013.01)

(56) References Cited

U.S. PATENT DOCUMENTS

| | | | |
|---|---|---|---|
| 7,131,073 | B2 | 10/2006 | Rosenberg et al. |
| 7,925,797 | B2 | 4/2011 | Wolff-Petersen |
| 8,108,566 | B2 | 1/2012 | Wolff Petersen |
| 8,281,046 | B2 | 10/2012 | Wolff-Petersen |
| 8,341,305 | B2 | 12/2012 | Wolff-Petersen |
| 8,577,049 | B2 | 11/2013 | Guntin et al. |
| 8,700,829 | B2 | 4/2014 | Casparian et al. |
| 8,956,234 | B2 | 2/2015 | Wolff-Petersen et al. |
| 9,579,048 | B2 | 2/2017 | Rayner et al. |
| 2002/0022496 | A1 | 2/2002 | Park et al. |
| 2002/0163498 | A1 | 11/2002 | Chang et al. |
| 2003/0236878 | A1 | 12/2003 | Egi |
| 2005/0085298 | A1 | 4/2005 | Woolston et al. |
| 2006/0030407 | A1 | 2/2006 | Thayer |
| 2006/0084504 | A1 | 4/2006 | Chan |
| 2006/0119586 | A1 | 6/2006 | Grant et al. |
| 2007/0198216 | A1 | 8/2007 | Aguilar et al. |
| 2008/0266250 | A1 | 10/2008 | Jacob |
| 2008/0268943 | A1 | 10/2008 | Jacob |
| 2009/0075687 | A1 | 3/2009 | Hino et al. |
| 2010/0227682 | A1 | 9/2010 | Reville et al. |
| 2010/0250794 | A1 | 9/2010 | Hanks et al. |
| 2011/0009192 | A1 | 1/2011 | Aronzon et al. |
| 2011/0021143 | A1 | 1/2011 | Kapur et al. |
| 2011/0021269 | A1 | 1/2011 | Wolff-Peterson et al. |
| 2011/0065503 | A1 | 3/2011 | Wolff-Petersen et al. |
| 2011/0113485 | A1 | 5/2011 | Little et al. |
| 2011/0244961 | A1 | 10/2011 | Soelberg et al. |
| 2012/0068939 | A1 | 3/2012 | Pemberton-Pigott et al. |
| 2012/0083209 | A1 | 4/2012 | Giles et al. |
| 2012/0264516 | A1 | 10/2012 | Rudchenko et al. |
| 2012/0311458 | A1 | 12/2012 | Wolff-Petersen et al. |
| 2012/0315983 | A1 | 12/2012 | Miller, IV et al. |
| 2013/0079154 | A1 | 3/2013 | Wolff-Petersen |
| 2013/0288759 | A1 | 10/2013 | Rom et al. |
| 2016/0001175 | A1* | 1/2016 | Aronzon ............... A63F 13/12 463/31 |
| 2016/0048507 | A1* | 2/2016 | Aronzon ............... G06F 9/454 463/29 |
| 2016/0263480 | A1* | 9/2016 | Wolff-Petersen ....... A63F 13/10 |
| 2016/0279512 | A1* | 9/2016 | Rom ..................... A63F 13/06 |
| 2017/0028296 | A1* | 2/2017 | Wolff-Petersen ....... A63F 13/10 |
| 2017/0282058 | A1 | 10/2017 | Mahlmeister et al. |
| 2017/0282059 | A1 | 10/2017 | Mahlmeister |

OTHER PUBLICATIONS http://us.battle.net/en/, 2 pgs. (2011).
http://www.esl.eu/, 2 pgs. (2011).
http://www.hltv.org/, 2 pgs (2011).
"ESL Pro Series", [http://www.esl.eu/benelux/pro-series/season5/, Apr. 26, 2012, 1 page.
"World of Warcraft", [http://us.battle.net/wow/en/community, Apr. 26, 2012, 1 page.
"ZXP 1000 Gaming Keyboard User Guide", Version 2.0, May 2007.
Blizzard Entertainment, "World of WarCraft MMO Gaming Mouse User Guide", 2008.
Otten, Martin, "Broadcasting Virtual Games in the Internet", Jun. 2001, 11 pages.
PCWorld, "Mechanical Keyboards: Reviews and FAQs", file:///Z:/CLIENT%20FILES/STEELSERIES/8381-0061-0075/8381-0068/Prior%20Art/Mechanical%20Keyboard%20FAQ_%20Pick%20the%20Right%20Switch%20_%20PCWorld.html, Apr. 20, 2015.

* cited by examiner

900

1600

1700

1800

1900

SYSTEM AND METHOD FOR OFFLINE CONFIGURING OF A GAMING ACCESSORY

CROSS-REFERENCE TO RELATED APPLICATIONS

The present application is a continuation of and claims priority to U.S. patent application Ser. No. 15/629,069, filed Jun. 21, 2017, which is a continuation of U.S. patent application Ser. No. 14/687,989, filed Apr. 16, 2015, now U.S. Pat. No. 9,713,767, which claims the benefit of priority to U.S. Provisional Application No. 61/982,081, filed on Apr. 21, 2014. All sections of the aforementioned application(s) and patent(s) are incorporated herein by reference in their entirety.

FIELD OF THE DISCLOSURE

The present disclosure relates generally to a system and method for managing use of an accessory. More specifically, the present disclosure relates to a system and method for configuring an accessory.

BACKGROUND OF THE DISCLOSURE

It is common today for gamers to utilize more than one gaming accessory. This is especially true of gamers who play on-line games or competitive games in a team or individual configuration. Gamers can have at their disposal accessories such as a keyboard, a general purpose gaming pad, a mouse, a gaming console controller, a headset to communicate with other players, a joystick, a computer console, or other common gaming accessories.

A gamer can frequently use a combination of these accessories in a single game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to other users.

BRIEF DESCRIPTION OF THE DRAWINGS

Reference will now be made to the accompanying drawings, which are not necessarily drawn to scale, and wherein.

DETAILED DESCRIPTION

Figure 1:
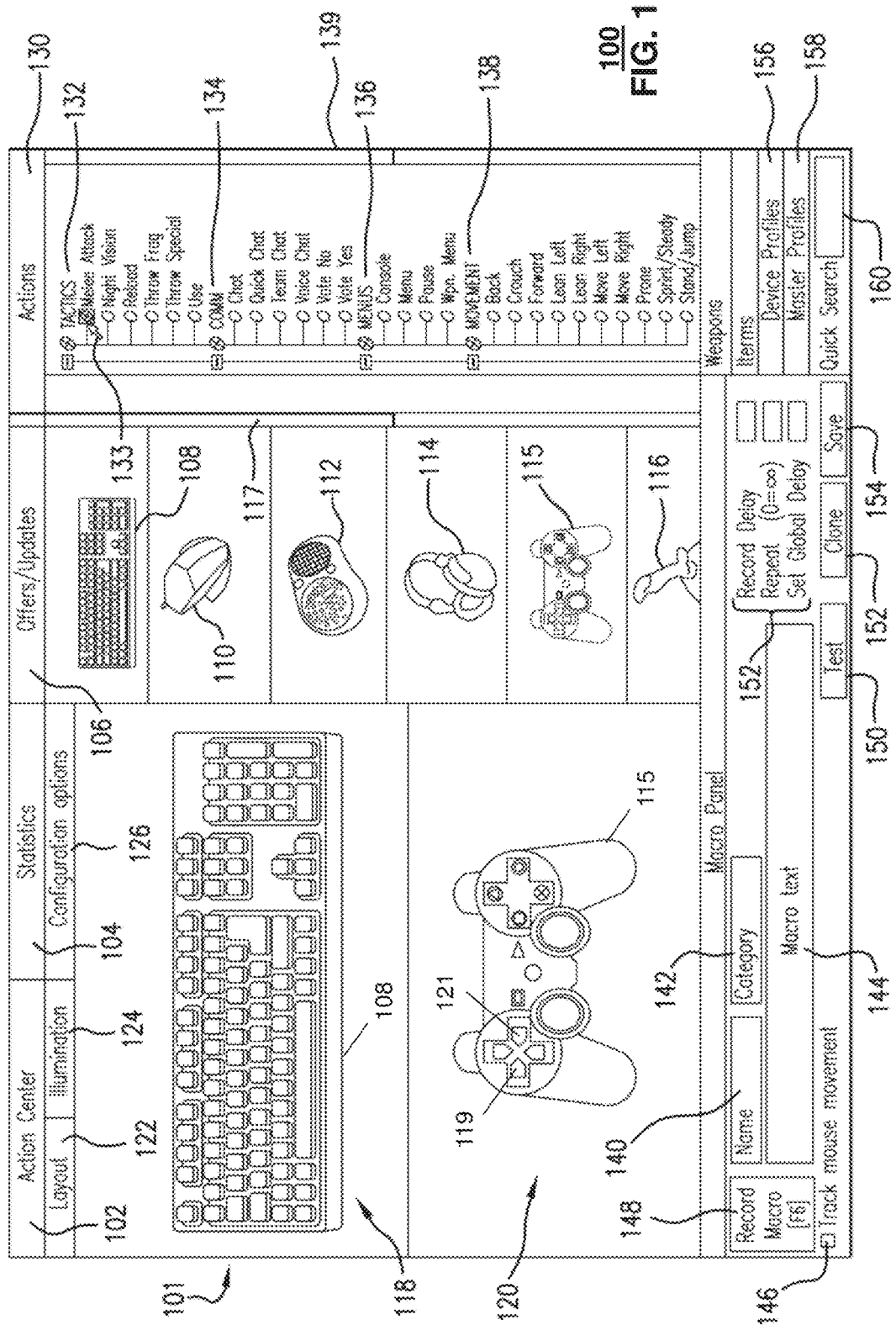
FIG. 1 depicts an illustrative embodiment of a Graphical User Interface (GUI) generated by an Accessory Management Software (AMS) application according to the present disclosure.

FIG. 1 depicts an illustrative embodiment 100 of a Graphical User Interface (GUI) generated by an Accessory Management Software (AMS) application according to the present disclosure. The AMS application can be executed by a computing device such as a desktop computer, a laptop computer, a tablet, a server, a mainframe computer, a gaming console, a gaming accessory, or any combination or portions thereof. The AMS application can also be executed by portable computing devices such as a cellular phone, a personal digital assistant, or a media player. The AMS application can be executed by any device with suitable computing and communication resources.

Figure 2:
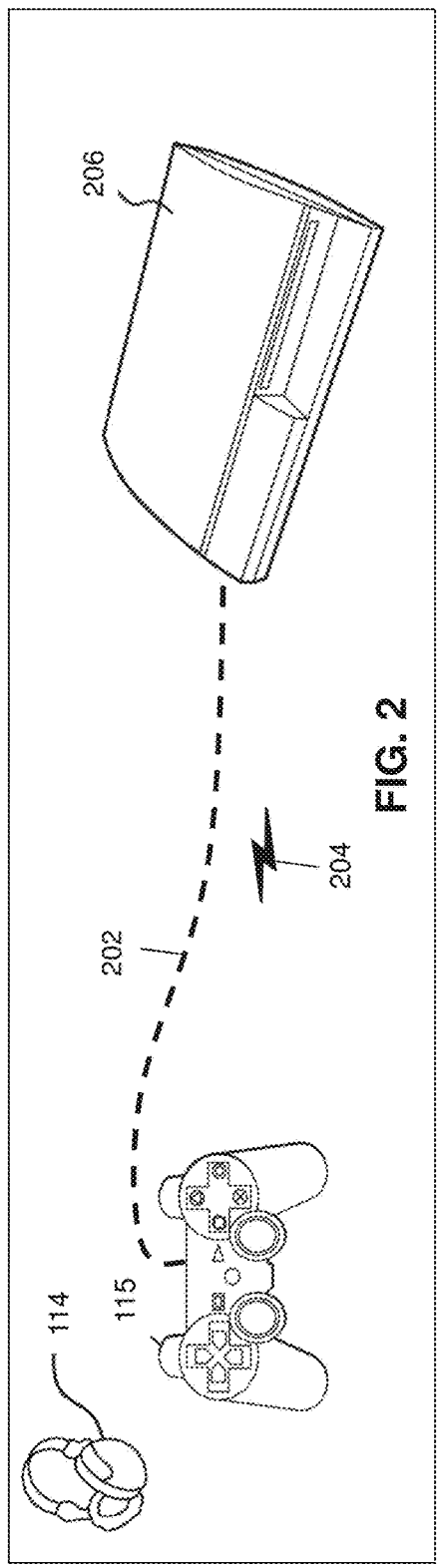
FIGS. 2-3 depict illustrative embodiments for communicatively coupling a gaming accessory to a computing device.

In accordance with embodiments of the disclosure, a gaming accessory can communicate with a computing device, and can itself be a computing device. In general, a gaming accessory can be understood as both a communication device and a computing device. FIG. 2 illustrates a number of embodiments for utilizing a gaming accessory (in this example, gaming controller 115) with a computing device 206 in the form of a gaming console. In the illustration of FIG. 2, the gaming controller 115 can be communicatively coupled to the gaming console 206 with a tethered cable interface 202 such as a USB or proprietary cable, or a wireless interface 204 such as WiFi, Bluetooth, ZigBee, or a proprietary wireless communications protocol. The cable interface 202 provides a means for communication that may be less susceptible to electromagnetic interference. It will be appreciated that the gaming controller 115 may further include a headset 114 (with or without a microphone not shown) utilized by a gamer to communicate with teammates and/or to listen to game sounds in high fidelity. In the illustration of FIG. 2, the AMS application can in whole or in part be executed by the gaming controller 115, the gaming console 206, or a combination thereof.

Figure 3:
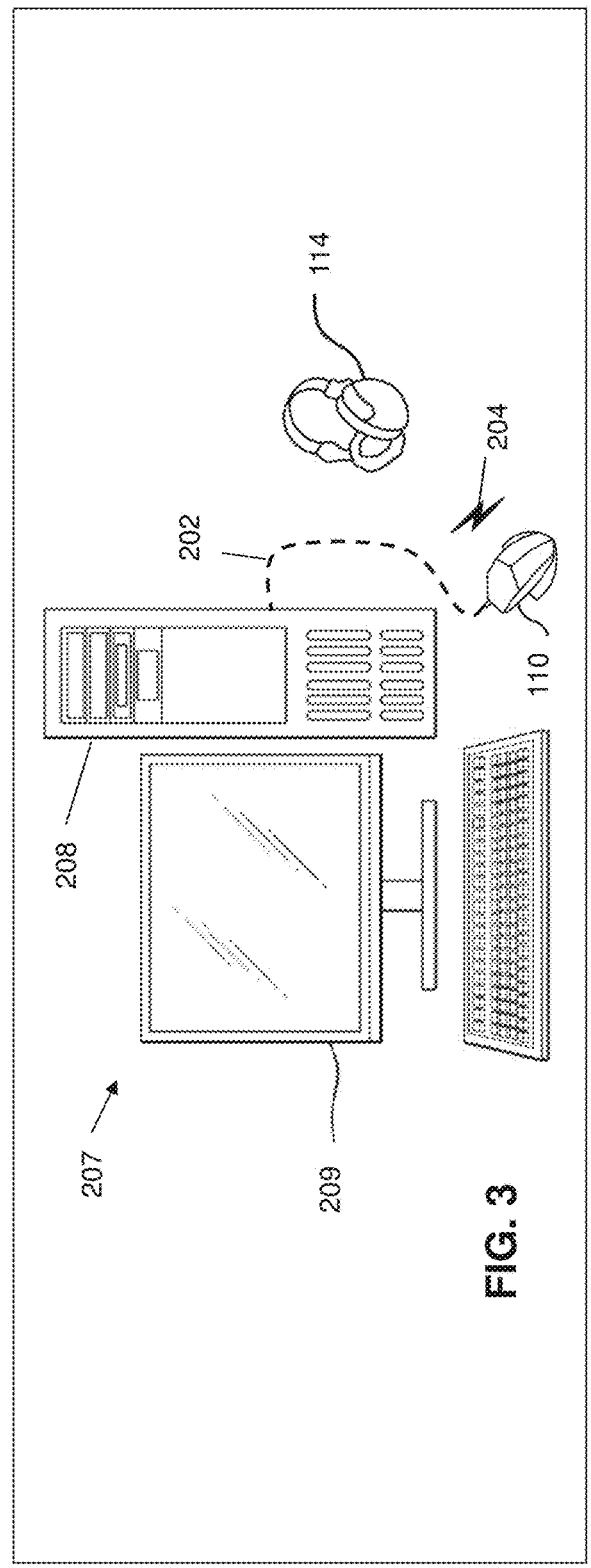

FIG. 3 illustrates a number of other embodiments for utilizing a gaming accessory with a computing device 206.

In this embodiment, the gaming accessory comprises a mouse 110 and the computing device 206 comprises a desktop computer with a processing unit 208 and a display device 209. The gaming accessory (in this example, mouse 110) can be tethered to the computing device 206 by a cable interface 202 (e.g., USB cable or proprietary cable) or a wireless interface 204. The cable interface 202 provides a means for communication that may be less susceptible to electromagnetic interference. It will be appreciated that the gaming accessory may further include a headset 114 (with or without a microphone not shown) utilized by a gamer to communicate with teammates and/or to listen to game sounds in high fidelity. In the illustration of FIG. 3, the AMS application can in whole or in part be executed by the gaming accessory, the computer, or a combination thereof.

For illustration purposes, the terms "gaming console" and "computer" will be used henceforth interchangeably to refer to computing device 206. It is understood that computing device 206 can represent without limitation a laptop computer, a desktop computer, a server, a tablet, a mobile phone (e.g., cell phone), a smart phone, a short-range mobility phone (e.g., a cordless or wired office or home phone), or a gaming system operatively coupled to a communication network for on-line or localized gaming. Accordingly, a computing device 206 can represent any device with suitable computing resources to perform the methods described in the subject disclosure.

Figure 4:
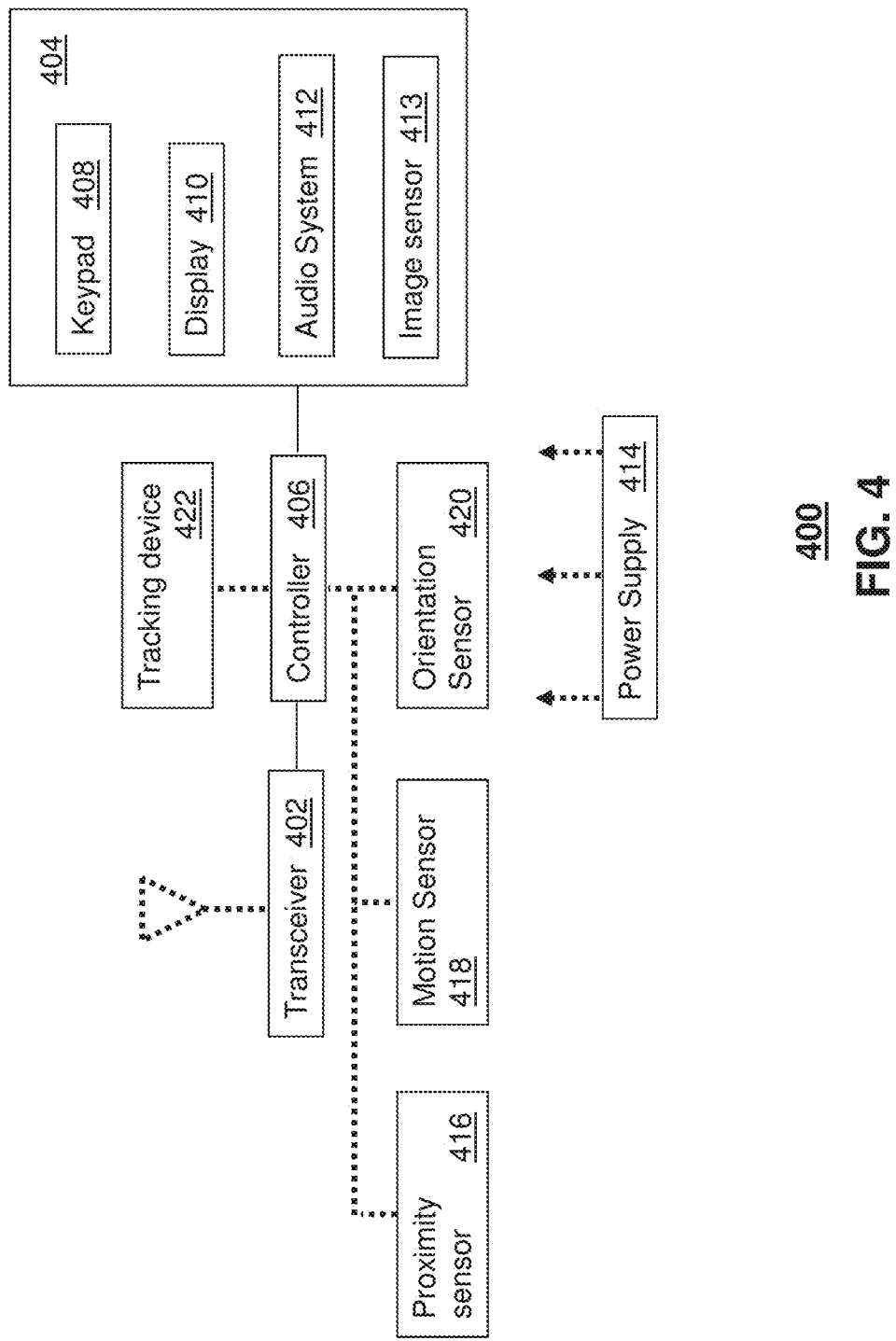
FIG. 4 depicts an illustrative embodiment of a communication device.

FIG. 4 depicts an illustrative embodiment of a communication device 400. Communication device 400 can serve in whole or in part as an illustrative embodiment of devices described in the subject disclosure. The communication device 400 can comprise a wireline and/or wireless transceiver 402 (herein transceiver 402), a user interface (UI) 404, a power supply 414, a proximity sensor 416, a motion sensor 418, an orientation sensor 420, a tracking device 422, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 utilizes touch-sensitive technology, a portion or all of the keypad 408 can be presented by way of the display 410 with navigation features. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as a electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics). The tracking device 422 can utilize laser sensing technology to track movement of the communication device 400 on a surface such as a mouse pad.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 as described herein can operate with more or fewer components described in FIG. 4 to accommodate the implementation of devices described by the subject disclosure. These variant embodiments are contemplated by the subject disclosure.

Figure 5:
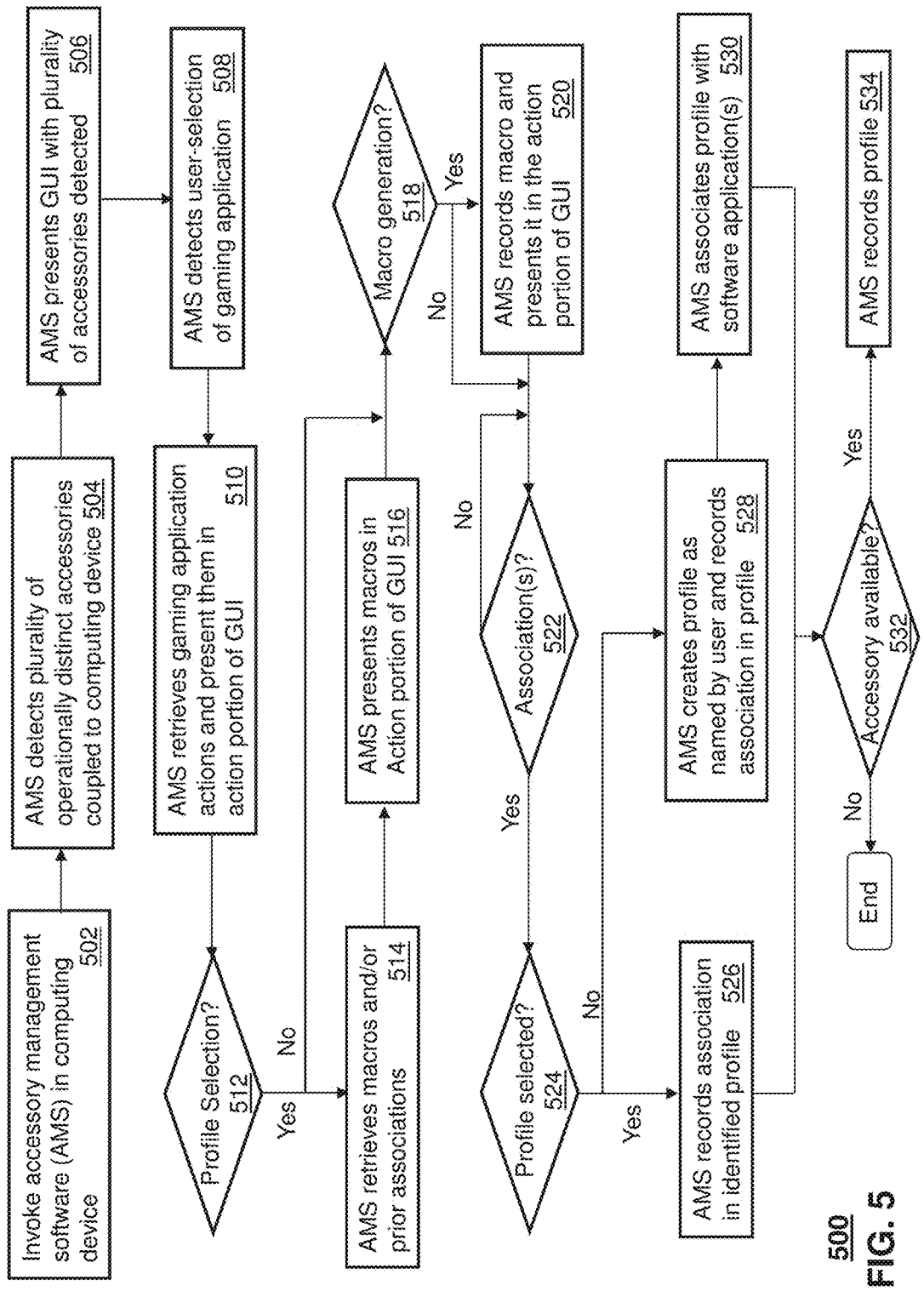
FIG. 5 depicts an illustrative embodiment of a first method utilized in the subject disclosure.
Figure 6:
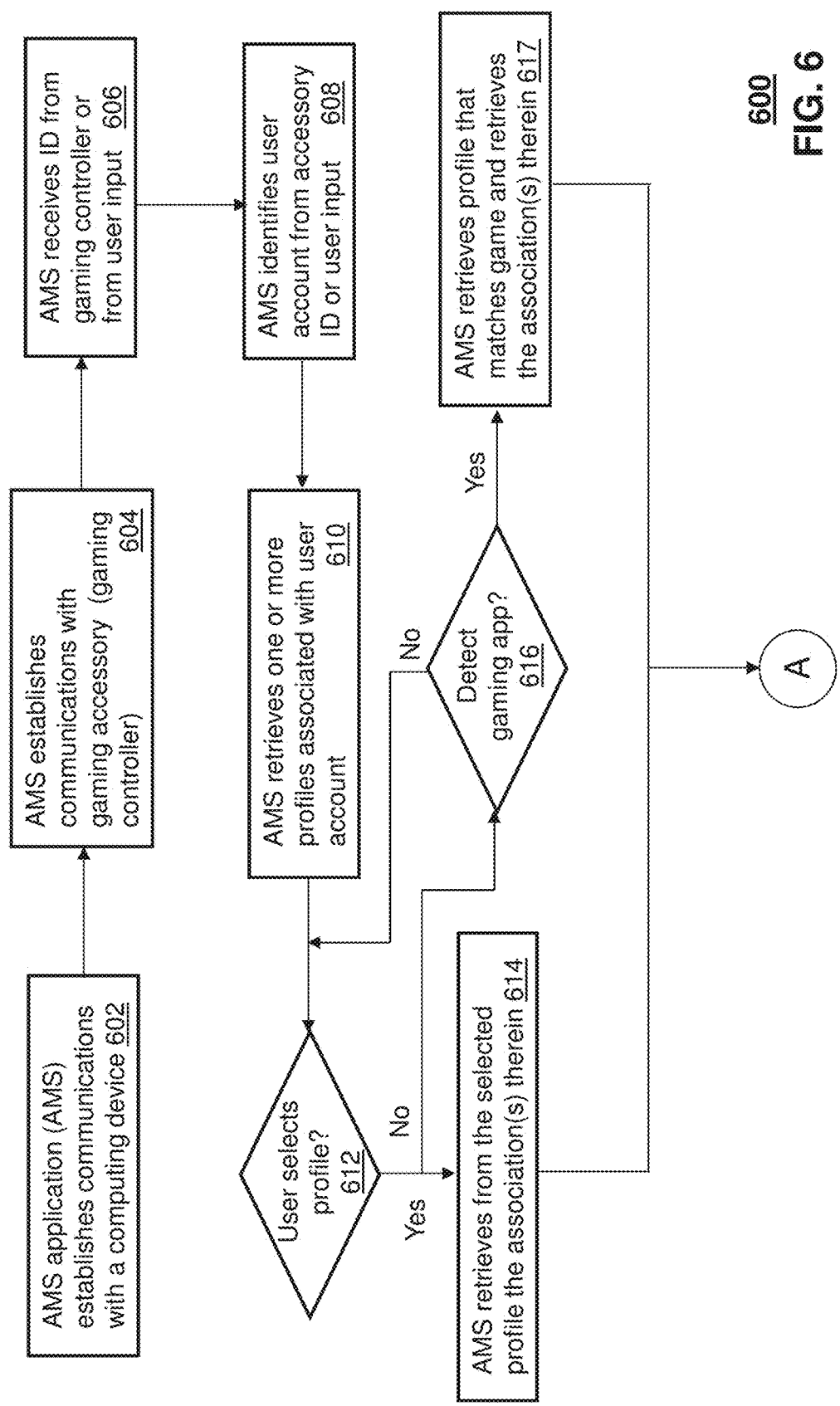
FIG. 6 depicts an illustrative embodiment of a second method utilized in the subject disclosure.
Figure 7:
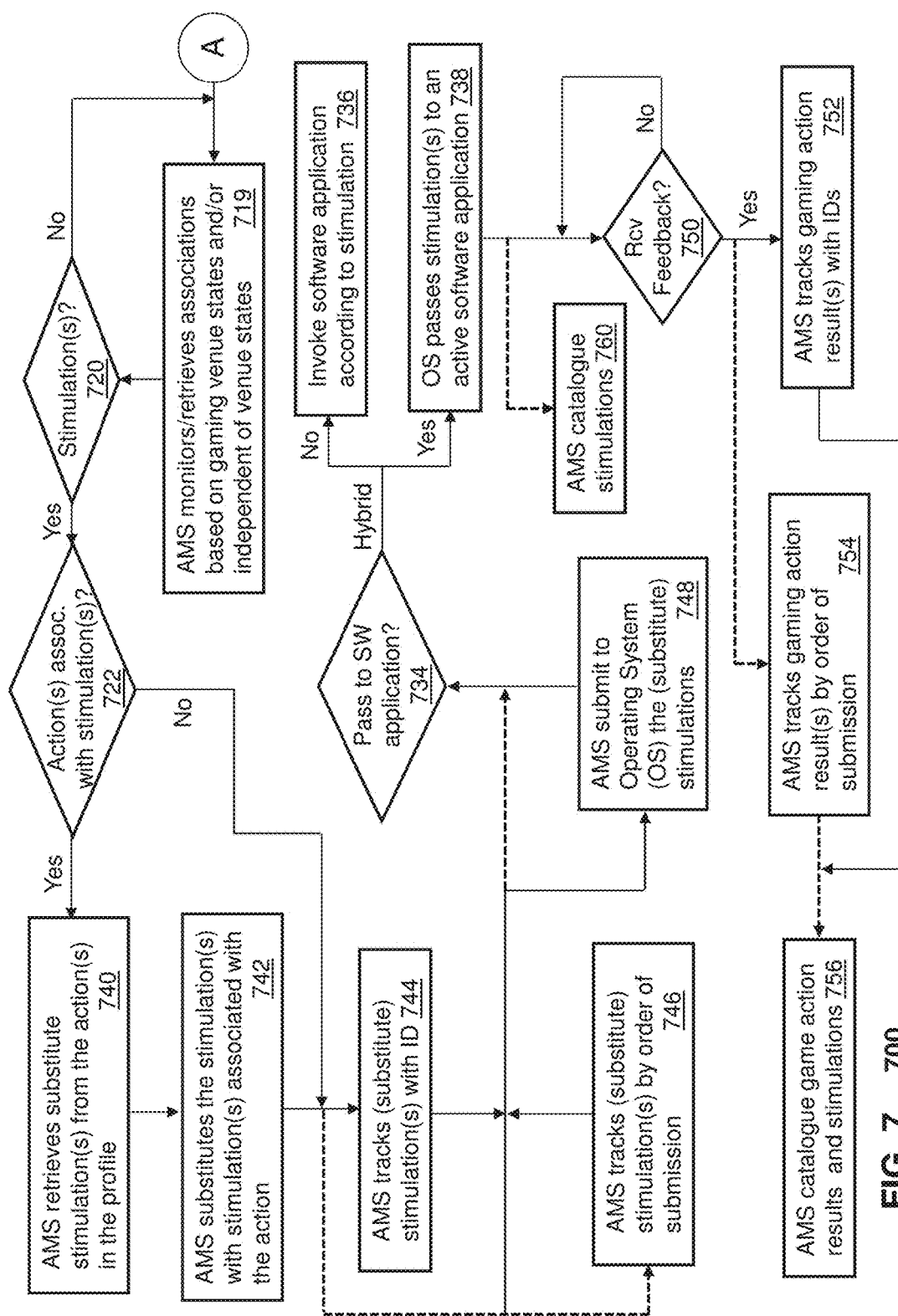
FIG. 7 depicts an illustrative embodiment of a third method utilized in the subject disclosure.

FIGS. 5-7 are flowcharts depicting methods 500-700 describing illustrative embodiments of the AMS application. Method 500 can begin with step 502 in which the AMS application is invoked in a computing device. The computing device can be a remote server (not shown), the gaming console or computer 206 of FIGS. 2-3, or any other computing device with suitable computing resources. The invocation step can result from a user selection of the AMS application from a menu or iconic symbol presented by the computing device 206, or when a user communicatively couples a gaming controller 115 or other form of accessory device with the computing device 206. In step 504, the AMS application can detect by way of software drivers in an operating system (OS) of the computing device 206 a plurality of operationally distinct accessories communicatively coupled to the computing device 206. The accessories can be coupled to the computing device 206 by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device 206 (or which can be an integral part of the computing device) and which can control aspects of the OS and/or a software application operating from the computing device 206. An accessory can represent for example a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1 depicting operationally distinct accessories such as a keyboard 108, a gaming controller 115, a joystick 116. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a particular software application such as a video game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the keyboard 108 can be associated with one of the buttons of the gaming controller 115 (e.g., the left button 119).

In one embodiment, a Melee Attack action can be associated by dragging this action to either the left button 119 or right button 120 of the gaming controller 115. Thus, when the selected button is depressed, the stimulus signal that is generated by the selected button of the gaming controller 115 can be substituted by the AMS application with the Melee Attack action. In another embodiment, the AMS application can be configured so that the Melee Action can be associated with a combination of key button presses (e.g., simultaneous depression of the left and right buttons 119, 121, or a sequence of button depressions: two rapid left button depressions followed by a right button depression).

In yet another embodiment, the AMS application can be configured so that the Melee Action can be associated with movement of the gaming controller 115 such as, for example, rapid movement or shaking of the gaming controller 115. In a further embodiment, the AMS application can be adapted to make associations with two dimensional or three dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can monitor gaming venue states by analyzing captured images produced by the gaming application (e.g., one or more still images of a tank, or a video of an avatar entering a tank), and/or by receiving messages from the gaming application by way of an application programming interface (API) thereby enabling the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by the OS of the computing device 206, or any other recordable stimulus to initiate, control or manipulate software applications. For instance, a macro can represent a user entering the identity of a software application (e.g., instant messaging tool) to be initiated by the OS upon the AMS application detecting a speech command using speech recognition technology.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions with input functions of the keyboard 108 or the gaming controller 115. Associations can also be made based on the two or three dimensional movements of the gaming controller 115. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

Referring back to step 526, once the associations have been recorded in a profile, the AMS application can determine in step 532 which of the accessories shown illustratively in FIGS. 1-3 are programmable and available for programming. If the AMS application detects that an accessory (e.g., keyboard 108, gaming controller 115) is communicatively coupled to the computing device 206 and determines that the accessory is capable of performing stimulus substitutions locally, the AMS application can proceed to step 534 of FIG. 5 where it submits the profile and its contents for storage in the accessory (e.g., the gaming controller 115 in FIGS. 2-3). Once the accessory (e.g., the gaming controller 115) is programmed with the profile, the accessory can perform stimuli substitutions according to the associations recorded by the AMS application in the profile. Alternatively, the AMS application can store the profile in the computing device 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can present a layout of the accessory (button 122), how the accessory is illuminated when associations between input functions and actions are made (button 124), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application as described in the subject disclosure. Selecting button 106 can also cause the AMS application to adapt the GUI 101 to present promotional offers and software updates.

The steps of method 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by method 500 or variants thereof. These undisclosed approaches are contemplated by the subject disclosure.

FIG. 6 depicts a method 600 for illustrating additional operations of the AMS application. In the configurations of FIGS. 2-3, the AMS application can be operating in whole or in part from the gaming controller 115, a gaming console 206, a computer 206, or a remote server (not shown). For illustration purposes, it is assumed the AMS application operates from the gaming console 206. Method 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulations, navigation, speech, the invocation of other software applications, macros or other suitable associations that result in substitute stimulations. The accessory stimulations can be stimulations that are generated by the gaming controller 115, as well as stimulations from other accessories (e.g., headset 114), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three dimensional lift of the mouse can cause the tank to steer according to the three dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three dimensional navigation data allows a gamer to control any directional vector of the tank including speed, direction, acceleration and deceleration. In an embodiment, the gaming controller is a mouse, and the user can invoke these functions by selecting the "Track mouse movement" box 146 in GUI 101.

In another illustration, the AMS application can detect a new gaming venue state as a result of the gamer directing the avatar to leave the tank and travel on foot. Once again the AMS application retrieves in step 719 associations related to the gaming venue state. In this embodiment, selection of buttons of gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 719, the AMS application retrieves the associations related to the venue state, and can perform substitutions of stimuli generated by the gaming controller 115, and/or speech commands received by microphone of the headset 114.

In one embodiment, the AMS application can be configured in step 719 to retrieve a profile that provides substitute stimuli for replacing certain stimuli generated by accessories. The associations recorded in the profile can be venue independent. In another embodiment, the AMS application can retrieve a combination of profiles, where one or more profiles provide substitute stimuli that are venue dependent and one or more other profiles provide substitute stimuli that are venue independent.

The AMS application can monitor in step 720 stimulations generated by the accessories coupled to the gaming console 206. The stimulations can be generated by the gamer by manipulating the gaming controller 115, and/or by generating speech commands detected by a microphone of the headset 114. If a stimulation is detected at step 720, the AMS application can determine in step 722 whether to forward the detected stimulation(s) to an Operating System (OS) of the gaming console 206 or the gaming application directly without substitutions. This determination can be made by comparing the detected stimulation(s) to corresponding associations in one or more profiles retrieved by the AMS application. If the detected stimulation(s) match the associations, then the AMS application proceeds to step 740 where it retrieves substitute stimulation(s) in the profile(s). In step 742, the AMS application can substitute the detected stimulation(s) with the substitute stimulations in the profile(s).

In one embodiment, the AMS application can track in step 744 the substitute stimulations by updating the stimulations with a unique identifier such as a globally unique identifier (GUID). In this embodiment, the AMS application can also add a time stamp to each substitute stimulation to track when the substitution was performed. In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first a game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Referring back to step 722, if the detected stimulation(s) do not match an association in the profile(s), then the AMS application proceeds to one of steps 744 or 746 in order to track the stimulations of the accessory as described above. In another embodiment, tracking of original stimulations or substitute stimulations can be bypassed by skipping steps 744 or 746.

Once the stimulations received in step 720 have been substituted with other stimulations at step 742 responsive to a detected association, or maintained unchanged responsive to detecting no association with substitute stimuli, and (optionally) the AMS application has chosen a proper tracking methodology for correlating gaming action results with stimulations, the AMS application can proceed to step 748 or 734.

Once the AMS application at step 748 supplies to the OS of the computing device 206 a gaming action (i.e., one or more substitute or original stimulations), the AMS application can proceed to step 734. The gaming action supplied to the OS at step 748 can be an unadulterated "original" gaming action or an alternative gaming action. At step 734, the OS determines whether to invoke in step 736 a software application identified in the stimulation(s) (e.g., gamer says "turn on team chat", which invokes a chat application), whether to forward the received stimulation(s) to the gaming software application in step 738, or a combination thereof. Alternatively, the AMS application can bypass step 748 and proceed to step 734 without invoking functions of the OS to determine whether to invoke a software application at step 736 or supply the gaming action (i.e., substitute or original stimulations) to the gaming software application in step 738, or a combination thereof. In yet another embodiment, tracking can be bypassed whereby original or substitute stimulations are processed by the AMS application at step 748, or step 734 without invoking functions of the OS at step 748 as previously described.

Contemporaneous to the embodiments described above, the AMS application can monitor in step 750 for game action results supplied by the gaming application via API messages previously described. For instance, suppose the stimulation sent to the gaming application in step 738 is a command to shoot a pistol. The gaming application can determine that the shot fired resulted in a miss of a target or a hit. The gaming application can respond with a message which is submitted by way of the API to the AMS application that indicates the shot fired resulted in a miss or a hit. If IDs such as GUIDs were sent with each stimulation, the gaming application can submit game action results with their corresponding GUID to enable the AMS application to correlate the gaming action results with stimulations having the same GUID.

For example, if the command to shoot included the ID "1234", then the game action result indicating a miss will include the ID "1234", enabling the AMS application in step 752 to correlate the game action result to the stimulation having the same ID. If on other hand, the order of game action results can be maintained consistent with the order of the stimulations, then the AMS application can correlate in step 754 stimulations with game action results by the order in which stimulation were submitted and the order in which game action results are received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

Figure 8:
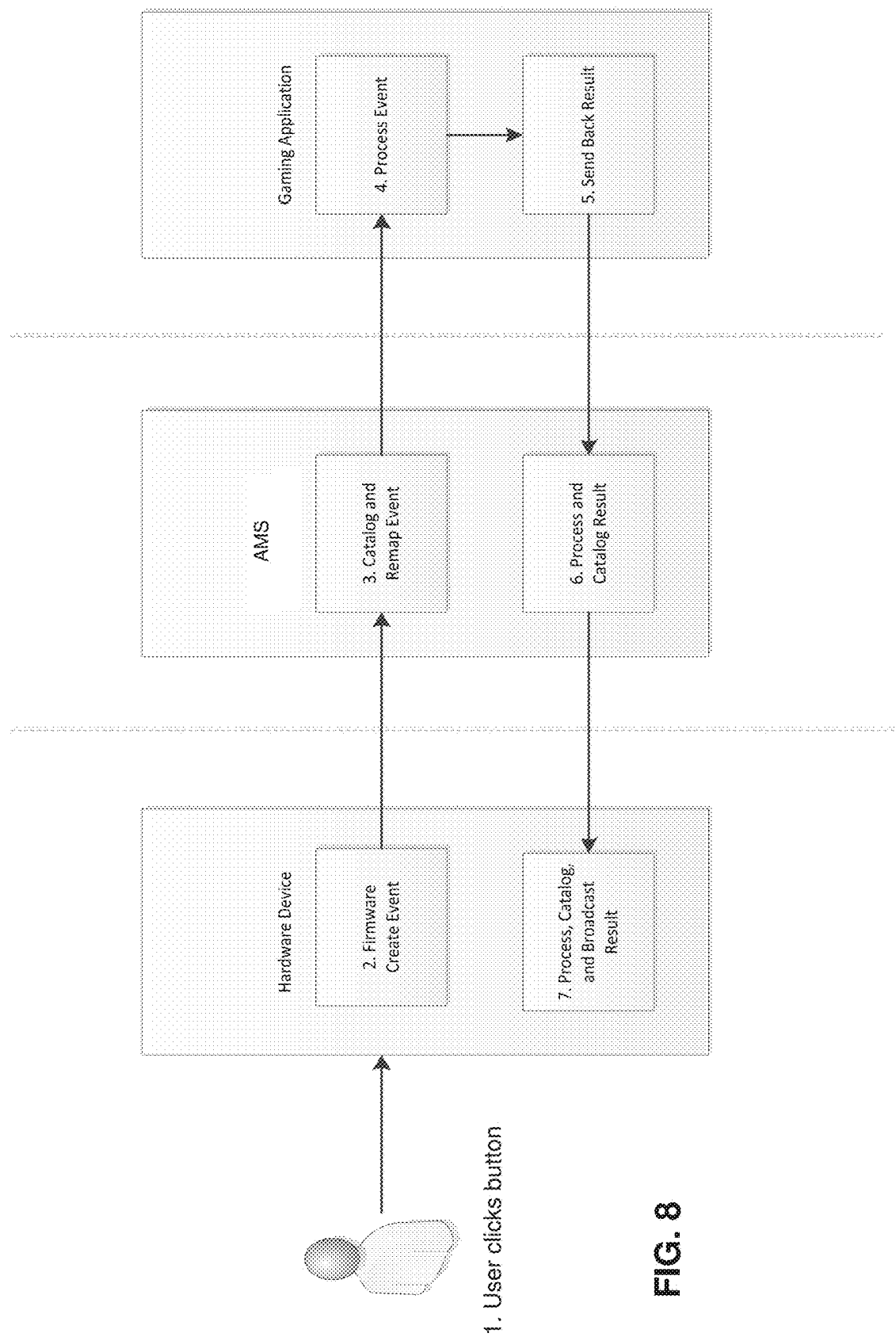
FIG. 8 depicts an illustrative embodiment of a system operating at least in part according to the methods of FIGS. 5-7.
Figure 9:
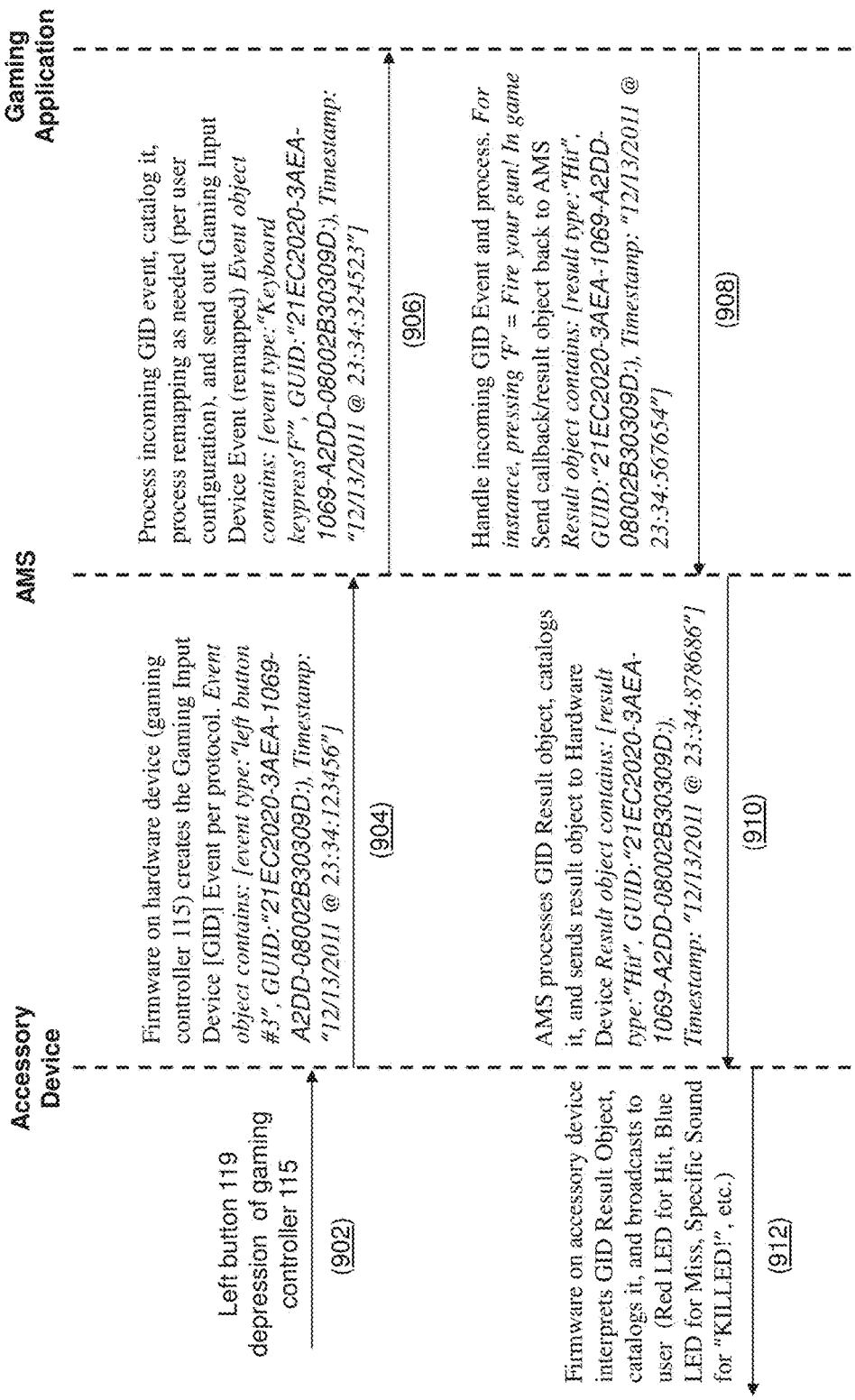
FIG. 9 depicts an illustrative embodiment of a communication flow diagram utilized by the system of FIG. 8.

FIGS. 8-9 illustrate embodiments of a system with a corresponding communication flow diagram for correlating stimulations and gaming action results. In this illustration a user clicks the left button 119 of the gaming controller 115. The gaming controller 115 can include firmware (or circuitry), which creates an event as depicted by event 2 in FIG. 8. The button depression and the event creation are depicted in FIG. 9 as steps 902 and 904. In step 904, the firmware of the gaming controller 115 can, for example, generate an event type "left button #3", and a unique GUID with a time stamp which is submitted to the AMS application. Referring back to FIG. 8, the AMS application catalogues event 3, and if a substitute stimulation has been predefined, remaps the event according to the substitution. The remapped event is then transmitted to the gaming application at event 4. Event 3 of FIG. 8 is depicted as step 906 in FIG. 9. In this illustration, the AMS application substitutes the left button #3 depression stimulus with a "keyboard 'F'" depression which can be interpreted by the gaming application as a fire command. The AMS application in this illustration continues to use the same GUID, but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 910, the AMS application correlates the stimulation "left button #3 (and/or the substitute stimulation keyboard "F") to the game result "Hit" and catalogues them in memory. The AMS application then submits to the accessory (e.g., gaming controller 115) in step 910 the game action results "Hit" with the same GUID, and a new time stamp indicating when the result was received. Upon receiving the message from the AMS application, the accessory in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

It will be appreciated that the embodiments of the present disclosure can be modified, reduced, or enhanced. For example, the AMS application can be executed from a gaming accessory (such as a gaming controller 115 or a mouse 110) or a computing device 206 to perform the embodiments described in the subject disclosure. The AMS application can also be operated from a remote server ("cloud services"). In yet another embodiment, functions of the AMS application can be distributed between devices. In yet another embodiment, the AMS application can be configured to track the performance of a gamer and adapt a threshold as the gamer improves or declines in performance.

For instance, as a gamer's performance improves with a particular gaming action, the threshold associated with the gaming action can be adapted to be less sensitive in detecting an over usage state. Similarly, the sensitivity of the threshold can be increased to promptly identify an over usage state of a gaming action if the gamer's performance declines as a result of an over usage of the gaming action. Additionally, the AMS application can be adapted to add gaming actions to an exclusion table when the gamer's performance substantially improves as a result of using the gaming action being excluded. The exclusion table can also be changed by the AMS application by removing a gaming action from the exclusion table responsive to its excessive use causing a decline in a gamer's performance.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

The subject disclosure further includes the embodiments described below, which may be combined in whole or in part with any other embodiments described herein.

In an embodiment, a gaming accessory can present a menu system of operating parameters to a user. The operating parameters of the gaming accessory can be understood as settings for the accessory that can be changed by the user to control a gaming application executing on a computing device. As noted above, the gaming accessory can comprise a game controller 115, a mouse 110, or any of numerous other devices. In this embodiment, the gaming accessory can be represented as a communication device 400 (which, as noted previously, can itself be a computing device). The menu system can be presented by way of the display 410. The menu system can present the user of the gaming accessory a plurality of programmable options for selecting settings to configure the accessory. The operating parameters can include without limitation:

(1) a movement count resolution parameter for navigating in a graphical user interface (GUI) presented by a software application such as an operating system, a video game, or otherwise. The software application in the present context can be an AMS application operating in a computing device or accessible to a computing device that is communicatively coupled to the device 400;
(2) a parameter to control line straightening when navigating in the GUI;
(3) a parameter to control jitter correction when navigating in the GUI;
(4) a parameter to control frequency of reports sent to the computing device;
(5) a parameter to control navigation acceleration in the GUI;
(6) a parameter to select or store one or more profiles;
(7) a parameter to control one or more presentation settings of the display 410 such as brightness, contrast, etc.;
(8) a parameter to select between a right-handed or left-handed setting for a portion of the plurality of buttons (making the device 400 ambidextrous); and/or a parameter to control a speed setting for scrolling in the GUI with the scroll wheel.

Other parameters suitable for configuring the gaming accessory are contemplated by the present disclosure.

In the foregoing embodiments, the computing device can represent a laptop or desktop computer, a gaming console, or any other suitable computing device (e.g. device 206 of FIGS. 2-3) which can accept instructions from the gaming accessory (device 400). The movement count resolution parameter referred to above can define a movement count reported to the computing device. The move count can be used by the software application to navigate in the GUI presented thereby as a function of a unit of movement of the device 400 on a surface detected by way of the tracking device 422. One form of a movement count resolution parameter can be a Count Per Inch (CPI) parameter.

In one embodiment the CPI parameter can be defined by a user with a range from 1 to 5001. A setting of 1 means that the device 400 reports to the computing device a single movement count for each detectable inch the device 400 moves across a surface such as a mouse pad. A single movement count can represent a movement across a fixed number of display pixels. Accordingly the lower the CPI number, the higher the resolution in navigating a GUI. On the other hand, as the CPI number is raised to a higher setting more movement counts are reported to the computing device per inch of movement by the device 400—hence, a lower resolution for navigating a GUI. Another form of a movement count resolution parameter can be a Dots Per Inch (DPI) parameter. Other parameters suitable for defining a movement count resolution are contemplated by the present disclosure.

In an embodiment, UI device configurations for one or more of the UI devices 404 can be provided to gamers or other users, including providing the configurations limited to the same gamer and/or exchanging configurations with other gamers. It should be understood that the exemplary embodiments described herein can be utilized in gaming environments and can also be utilized in non-gaming environment with software applications being executed on behalf of other types of users. In another exemplary embodiment, the providing of configurations can be adjusted based on a number of configuration criteria including a location of a gamer, a relationship of the gamer to other gamers, the time of day, the environment of the gamer, and/or parental controls placed over providing the configurations. Each of these configuration criteria can be utilized alone in providing the configurations and/or each of these configuration criteria can be utilized in combination with other factors, such as the described criteria or other factors that have not been described.

In another embodiment, the adjustment to the providing of UI device configurations can utilize one or more of these configuration criteria to select targeted UI device configurations from among a group of UI device configurations that are stored in a memory of the system, which can include a database accessible by a web server. For example, the group of UI device configurations can be provided to the system solely by the gamer who is requesting configurations. In another example, the group of UI device configurations can be provided to the system by the gamer and/or by one or more other gamers, who may or may not be associated with the gamer. Continuing with this example, in one embodiment the group of UI device configurations that are stored in memory can be generated solely based on input from gamers, although other factors can also be utilized.

The present disclosure also contemplates the group of UI device configurations, which are stored in memory, being based on configurations or other information provided by sources other than gamers. For instance, a developer of a game can provide one or more UI device configurations that it believes is optimal for its game. In another example, stored UI device configurations received from gamers can be adjusted by the system to be more compatible with potential configuration criteria, such as the time of day or environment in which it is anticipated the game will be played. For instance, a UI device configuration can be received from a gamer, which results in depiction of violent graphics. This UI device configuration can then be adjusted to depict less violent graphics in accordance with the configuration criteria of parental control, a gamer's age and so forth. The system can store both the original UI device configuration and the adjusted UI device configuration (e.g., a different age-based version) so that the configuration criteria can be applied for selecting among the two potential configurations. In another example, a UI device configuration can be received from a gamer which includes a macro for audibly presenting a message during a game, such as telling another player to "duck." This UI device configuration can then be adjusted to lower the volume of the message or add a graphical indicator to the message in accordance with the configuration criteria of time of day or environmental lighting. The system can store both the original UI device configuration and the adjusted UI device configuration so that the configuration criteria can be applied for selecting among the two potential configurations.

In one embodiment, targeted UI device configurations that have been selected from among a group of UI device configurations that are stored in the memory of the system, can be presented to a requesting gamer for provisioning his or her computing device. The gamer can then select from among the targeted UI device configurations to configure the computing device. In this embodiment, the system is able to filter UI device configurations based on one or more configuration criteria so that a list of UI device configuration from which the requesting gamer can choose, are more suited for the requesting gamer's needs, including his or her particular environment. In another embodiment, the system can apply the configuration criteria and operational parameters of the host and/or peripheral device to determine a target UI device configuration and to transmit the provisioning information for the target configuration based on the determination without the need for a selection by the user.

Figure 10:
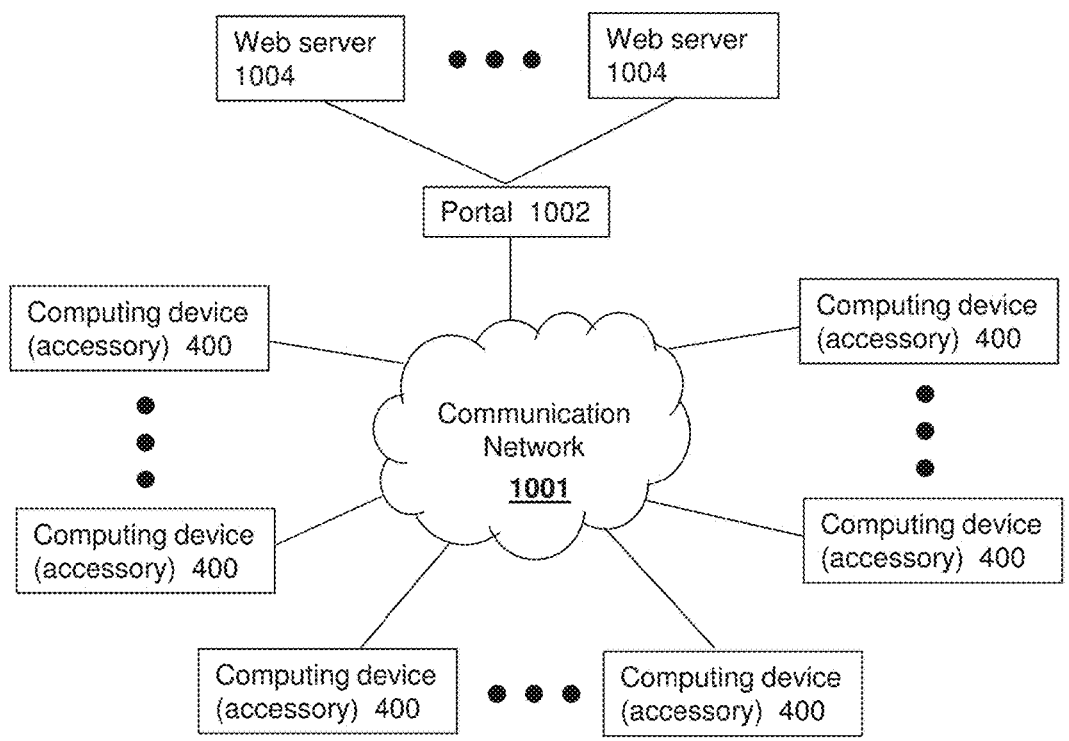
FIG. 10 depicts an illustrative embodiment of a communication system.

FIG. 10 depicts an illustrative embodiment of a communication system 1000. The communication system 1000 can comprise a portal 1002 operating from one or more common web servers 1004. The portal 1002 can be communicatively coupled to a plurality of computing devices 400 representing any of the aforementioned embodiments of the computing device of FIG. 1. The computing devices 400 can exchange messages with the portal 1002 by way of the communication network 1001 which can utilize common circuit-switching technology and/or packet-switching technology to support communication sessions therebetween. The circuit-switching or packet-switching technologies can correspond to common wireline or wireless access technologies supportive of the access technologies previously described for the computing device 400 of FIG. 1, as well as combinations thereof.

Figure 11:
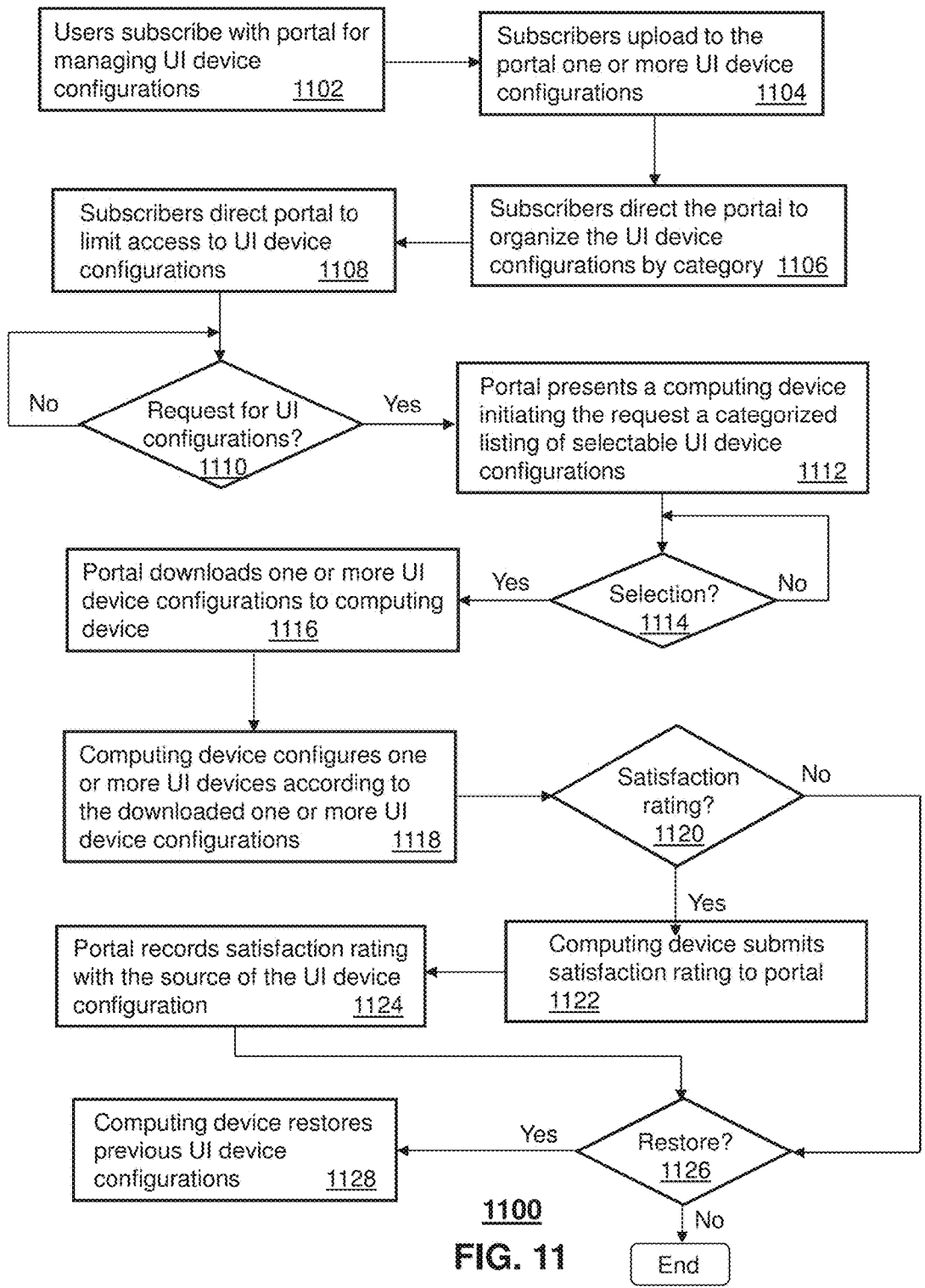
FIG. 11 depicts an illustrative embodiment of a method operating in the communication system of FIG. 10.
Figure 12:
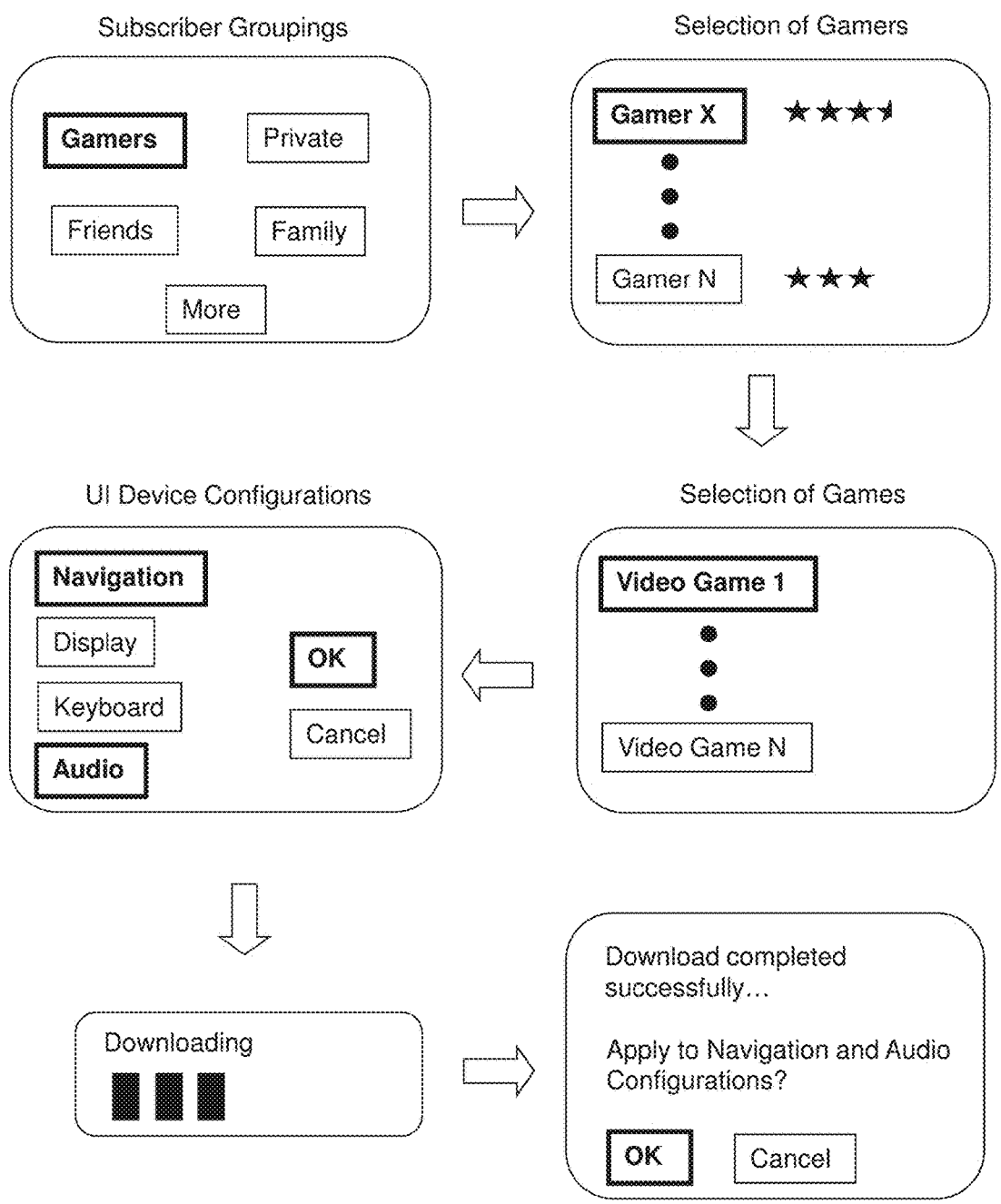
FIG. 12 depicts an embodiment of a graphical user interface illustrative of the method of FIG. 11.

The portal 1002 can support the exchange of UI device configurations as described by method 1100 of FIG. 11. FIG. 12 depicts an embodiment of a graphical user interface illustrative of method 1100.

Method 1100 can begin with step 1102 in which users of computing devices 400 subscribe to the portal 1002 to manage UI device configurations. Each user can access the portal 1002 by way of a common Internet browser (e.g., Mozilla Firefox™, Internet Explorer™, etc.). The subscription process can entail a policy in which each prospective subscriber provides contact information (e.g., first and last name, email address, telephone number, etc.). Once a user becomes a subscriber, the portal 1002 can assign the user a login name and a password defined by the subscriber or the portal. The services of the portal 1002 can be free of charge, at a fee commensurate with the services provided, or in accordance with specific promotions a combination of free services for some subscribers and fee-based services for others.

In step 1104, the subscribers can upload to the portal one or more UI device configurations utilized by their computing device 400. In the present context, a UI device can correspond to any device that can serve as a user interface that presents and/or controls in part operations of the computing device 400. Common forms of UI devices can include without limitation a keyboard 108, a navigation device 110, a display 112, or an audio system 114 with any of the embodiments previously described for the computing device 400 of FIG. 1. Method 1100 can also be applied to other forms of UI devices not described herein that at the present time or in future generations of computing devices can serve as a user interface.

UI device configurations can take on innumerable embodiments. For example, a keyboard configuration can correspond to one or more character macros created by the subscriber uploading the configurations to the portal. Macros can be useful for reducing time to enter a sequence of characters, or can also be used to reassign keys of the keyboard. For example, a subscriber may find it useful in certain gaming applications to reassign keys (e.g., the number "9" reassigned to the letter "R"). Thus, when a particular game is running the selection of the "R" key produces a character output of "9" as if the "9" key had been depressed. Similarly, the subscriber can create a macro in which two or more keystrokes are generated from a single keystroke. For example, a macro can be created so that when the "F11" key is selected, a sequence of characters can be associated and generated with the selection of this key; for instance, selecting F11 can be designed to produce the character string "Hello". In addition to macros, the subscriber can upload keyboard configurations managed by an operating system (OS) of the computing device. OS-related keyboard configurations can include without limitation a character repeat delay configuration, a character repeat rate configuration, a cursor blink rate configuration, a software driver for the keyboard, or combinations thereof.

A display configuration can correspond to color calibration settings of the display, sharpness settings of the display, refresh rate settings of the display, a desktop configuration, a window appearance configuration, a display resolution configuration, a configuration for a plurality of monitors that expand the desktop capacity of a computing device, a touch-sensitivity configuration for touch-sensitive displays, a software driver for the display, or combinations thereof.

A navigation device configuration can correspond to one or more navigation button configurations, a selection speed configuration for the one or more navigation buttons, a selection lock configuration for the one or more buttons, a pointer selection configuration, a pointer speed configuration, a snap configuration for the pointer, a visibility configuration for the pointer, a configuration for a rotational mechanism of the navigation device, a navigation lift configuration for establishing a bottom surface detection setting of an optical sensor (or similar surface sensor) of the navigation device, an accelerometer configuration, a software driver for the navigation device, or combinations thereof.

An audio system configuration can correspond to a volume configuration, a balance configuration, an audio equalization configuration, a stereo configuration, a noise reduction configuration, a digital audio playback configuration, an audio configuration for actions taken by the navigation device, a configuration of a microphone of the audio system, a multi-dimensional audio settings (e.g., 3 or more dimensions such as a 5.1 audio configuration, 7.1 audio configuration, and so on), a software driver for the audio system, or combinations thereof.

From these illustrative embodiments of UI device configurations, a subscriber of the portal 1002 can submit to the portal any portion of the aforementioned configurations or other suitable UI device configurations for archiving purposes. The submission process can take place by way of a software application operating in the computing device 400 which is capable of retrieving UI device configurations from an operating system of the computing device or from another suitable storage location in the computing device or remote to the computing device (e.g., an external local or remote hard drive, remote server, etc.). The software application can be managed by the subscriber (user) of the computing device 400.

In step 1106, subscribers can direct the portal 1002 by way of a browser of the computing device 400 to organize the UI device configurations. For instance, a portion of subscribers having an interest for gaming may desire to organize their UI device configurations amongst a social network of gamers. Another portion of subscribers may want to create a social network of friends and family Other subscribers may be less discriminating and choose to share their UI device configurations with any subscriber of the portal 1002. Thus, any social and/or organizational hierarchy can be created by the subscribers, and/or a service provider of the portal 1002. The subscribers can also establishing in step 1108 sharing limitations of the UI device configurations by limiting the community of subscribers that can access their archived UI device configurations.

For example, some subscribers can define a buddy list for exchanging UI device configurations only with subscribers listed in the buddy list. Other subscribers can choose not to share their UI device configurations with any subscribers. Such subscribers can choose to use the portal 1002 for private purposes such as for ease of portability between computing devices 400. For instance, if a subscriber changes computing devices 400, said subscriber can access the portal 1002 by way of a common browser and download a software application to the computing device 400 to assist the subscriber in the transfer of the subscriber's UI device configurations to the new computing device. Before updating the UI device configurations of the new computing device 400, the software application can store preexisting settings in the event the subscriber wants to restore these setting at some point in time. This feature can be useful in situations where the subscriber desires to transition between computing devices 400 on a temporary basis (e.g., renting or borrowing a computing device). This restoration technique can also be applied to subscribers that share UI device configurations.

Once the UI device configurations have been uploaded and organized with sharing limitations, the portal 1002 can monitor requests generated by computing devices 400 of subscribers requesting a presentation in step 1112 of available UI device configurations, which can be downloaded and applied to the UI devices of the requesting computing device in steps 1116-1118 once a selection is detected in step 1114. Steps 1116-1118 can also include a process or recording preexisting UI device configurations before they are changed in the event the subscriber later desires restore them.

FIG. 12 depicts illustrative embodiments of GUI snapshots of portions of steps 1112-1118. In this illustration a first GUI presented by the computing device 400 of a subscriber depicts subscriber groupings which can be established by the subscriber in step 1106 and/or the service provider of the portal 1002. In this illustration, the GUI shows groupings for "Gamers", "Friends", "Family", "Private", and others which can be viewed by selecting "More".

The Gamers GUI button can represent a social networking list of subscribers interested in gaming A Friends or Family GUI button can represent a limited set of subscribers sharing UI device configurations that have been selectively defined in step 1106 by a subscriber. The Private GUI button can represent UI device configurations which the subscriber of the portal 1002 does not share with other subscribers. In illustration purposes only, it is assumed that the subscriber selects the Gamers GUI button (depicted by the bold font and thicker outline). Responsive to said selection, the portal 1002 presents a new GUI with a selection of Gamers. Each gamer can be identified by name or pseudo name and can be assigned an average rating determined from an aggregation of ratings collected by the portal 1002 from subscribers associated with the Gamers grouping. The more stars depicted next to a gamer, the higher a rating of satisfaction by subscribers downloading the UI device configurations supplied by the gamer.

In this illustration, the subscriber selects Gamer X perhaps because of a higher satisfaction rating than the other gamers, or because the subscriber likes the particular gamer. This selection transitions to a GUI that lists video games which Gamer X has provided differing UI device configurations. Upon selecting the first video game, the portal 1002 presents another GUI with a selection of UI device configurations. Each UI device can be listed separately so that the subscriber can selectively choose the UI devices of interest. In this example, the subscriber chooses the navigation device and the audio system configurations supplied by Gamer X for "Video Game 1".

Upon selecting the OK GUI button, the portal 1002 begins to download the navigation device and audio system configurations to the computing device 400 of the subscriber (depicted by the download progress GUI). Once the navigation device and audio system configurations have been successfully downloaded, the subscriber has the option to apply the configurations or reject the update. When the OK button is selected the computing device 400 updates the UI devices per the downloaded configurations and begins operating said UI devices in accordance with these configurations. The update process can be executed by configuration software operating in the computing device by way of its operating system or software downloaded from the portal 1002.

It would be apparent to an artisan of ordinary skill in the art that the GUIs depicted in FIG. 12 are illustrative and non-limiting. Said artisan can expect that any GUI arrangement can be used to effectuate steps 1112-1118. Additionally, it would be apparent to said artisan that the organization of subscribers, and the categorization of UI device configurations can be arranged in other ways while effectuating an end result of updating UI device configurations of a computing device 400 by way of portal 1002.

Method 1100 can further include steps for rating the UI device configurations downloaded from the portal 1002. In step 1120, the portal 1002 can for example, detect that a subscriber has invoked a process to submit a satisfaction rating using a software application supplied by the portal 1002 and operating in the computing device 400 or by way of a browser interface to the portal. The satisfaction rating can be a simple GUI selection of zero to five stars, five stars being the highest level of satisfaction, with half stars also selectable. Once the selection has been made, the portal software operating in the computing device 400 or the browser transmits to the portal 1002 the satisfaction rating in step 1122, which the portal records in step 1124 according to the source of the UI device configuration, which in this illustration, is Gamer X. The portal 1002 can use the supplied rating of this subscriber (and others downloading the same or similar UI device configurations of Gamer X) to update the satisfaction rating of Gamer X.

Whether or not a satisfaction rating is provided by the subscriber, the subscriber can be presented by way of portal 1002 or portal software operating locally in the computing device 400 an option in step 1126 to restore the preexisting UI device configurations. If a restoration option is selected in step 1126, the computing device 400 can proceed to step 1128 and restore UI device configurations existing before step 1118.

Figure 13:
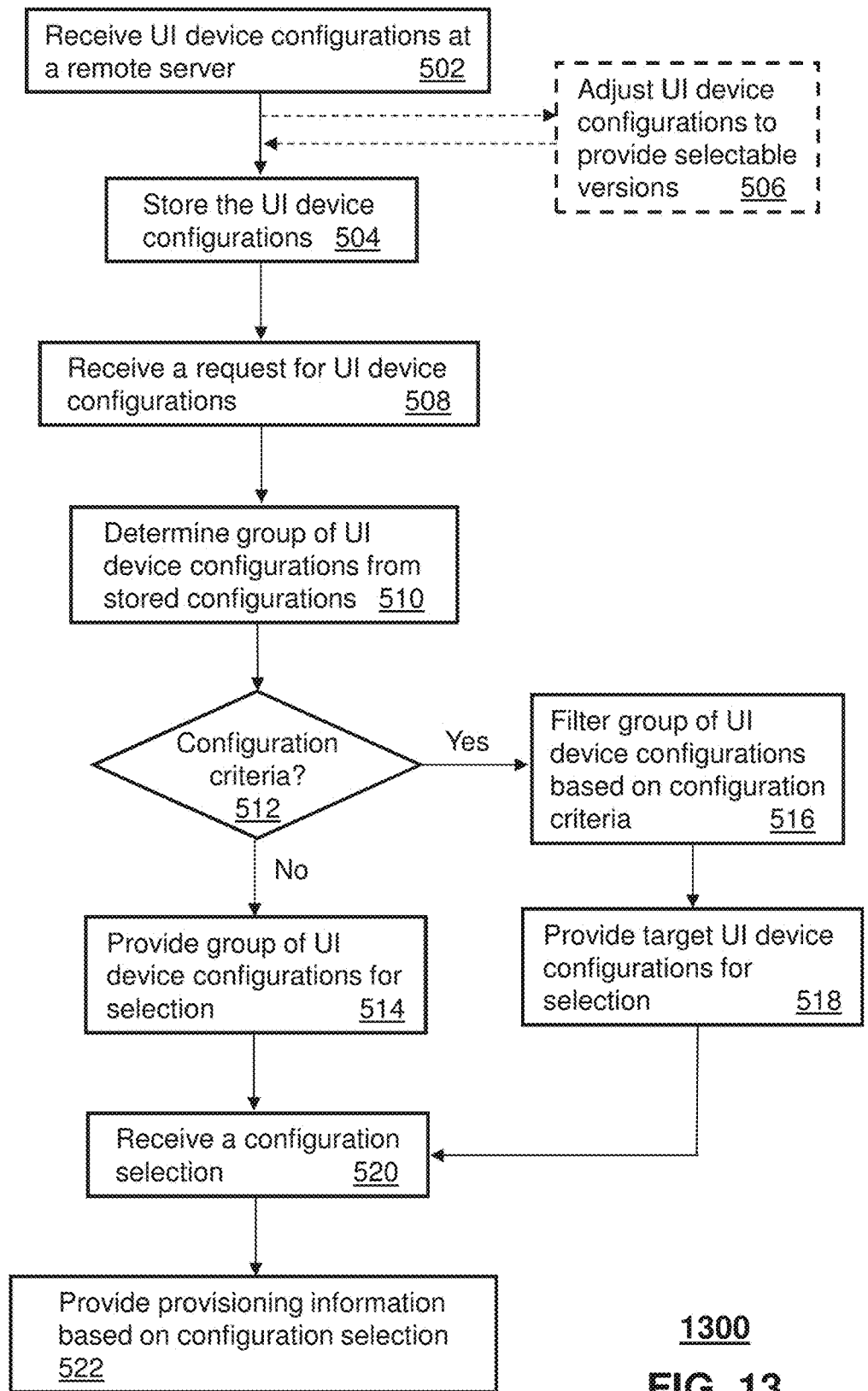
FIG. 13 depicts an illustrative embodiment of a method for provisioning settings and configurations to computing devices and/or peripheral devices.

FIG. 13 illustrates a method 1300 of providing UI device configurations to one or more users. Method 1300 can be used in the context of video games, but the present disclosure contemplates utilizing the device configuration for other application(s) executed by the computing device(s) 400. Method 1300 can begin with step 1302 in which UI device configurations are received. The configurations can be received at a remote server or servers, such as web servers 1550 shown in FIG. 15. The UI device configurations can be configurations or settings for the computing device 400, peripheral devices connectable with the computing device, and so forth. The configurations can be received from various sources, including a user for his or her own personal use, one or more other users for use by others, including providing of selective access to the use, and other entities, such as software developers that generate configurations for video games or other software applications. In step 1304, the received UI device configurations can be stored in a memory that is accessible upon request, such as a database that can be accessed by the web server 1550 to satisfy a request for UI device configuration selections.

In one embodiment in step 1306, the received UI device configurations can be adjusted to generate different versions of the received UI device configuration. For example, different versions can be generated so as to be compatible with different host and/or peripheral devices. For instance, a user may provide the web server 1550 with a UI device configuration that includes macros usable on an XBOX® controller with a particular game. The web server 1550 can then generate a second version of the UI device configuration that includes the same macros but that are usable on a PlayStation® controller with the particular game. The different versions can also be generated based on a number of different factors, such as different versions of UI device configurations for different games, where the configuration is translated to provide for the same result across multiple different games (e.g., a sequence of moves by a game character that may require different inputs across different games).

In another embodiment, the different versions can be generated to accommodate, or otherwise be customized based on, conditions which may be associated with a computing device 400 that later requests the UI device configuration. For example, versions of the UI device configuration can be generated in response to parental controls that seek to reduce violent content. Web server 1550 may receive a first UI device configuration that can be used for presenting violent content. The web server 1550 can generate a second version of the UI device configuration that can be used to present a limited amount of the violent content which is age appropriate. The web server 1550 can generate a third version of the UI device configuration that removes all of the violent content.

Other factors can also be utilized in generating different versions of the UI device configurations. For example, the location of a requesting device can be a factor for adjusting UI device configurations. As another example, the environment and/or time of day of a requesting device can also be a factor, such as whether the viewing area is dark which would require graphics that were brighter. Other graphics, including text, can be adjusted based on the location, such as changing the language of text or the scenery based on the location of a requesting device. Based upon a number of these factors, the web server 1550 can generate different versions of the UI device configurations to be stored in memory in step 1304 in the event that a requestor associated with the particular factors seeks a UI device configuration. The present disclosure also contemplates these versions being generated after receipt of the request, such as based on information (e.g., configuration criteria) associated with the request.

In step 1308, a request for UI device configurations can be received at the web server 1550 such as from computing device 400. In response to the request, the web server 1550 can determine a group of UI device configurations chosen from among the stored UI device configurations in step 1310. It should be understood that the stored configurations can also include configurations located at multiple storage devices, including storage devices of third parties. For example, a request can be received for UI device configurations for playing a particular game using a particular computing device. The web server 1550 can search the memory that includes the stored UI device configurations and can determine which, if any, of the stored configurations can be utilized for playing the particular game using the particular computing device. Operational parameters of the host device, peripheral device, display device, network, game being played, and so forth can be among the factors used to determine which, if any, stored configurations are compatible for the request.

In step 1312, a determination can be made as to whether there is any configuration criteria associated with the request. Configuration criteria is one or more factors that can be used for filtering the determined group of UI device configurations to generate target UI device configurations that are customized to the user based on the configuration criteria. If there is no configuration criteria associated with the request then method 1300 proceeds to step 1314 and provides the group of UI device configurations for presentation in a GUI. The GUI can be presented at the requesting computing device 400 and can be presented in various formats. For instance, selectable options for the UI device configurations can be presented, which may or may not include additional information, such as identifying a gamer that donated the configuration, identifying a satisfaction rating associated with the configuration and/or the gamer, identifying a history of selections by the requestor that may be associated with one of the particular configurations, such as whether the requestor has ever utilized other configurations donated by the particular gamer, and so forth. Categories of configurations can be generated by the web server 1550 and/or by the requestor, including based on the configuration criteria, social networks, friends, family, satisfaction ratings and so forth.

If, on the other hand, there is configuration criteria associated with the request, then method 1300 can proceed to step 1316 to filter the determined group of UI device configurations in order to generate target UI device configurations selected from among the group. In step 1318, the target UI device configurations can be provided to the computing device 400. The target UI device configurations can be presented in the GUI at the computing device 400 so that the requestor can then select from amongst the target configurations. The target configurations are filtered such that the requestor receives configurations that are better suited to the criteria associated with the requestor, such as the requestor's environment, parental controls, location, friends, family, time of day and so forth.

Figure 14:
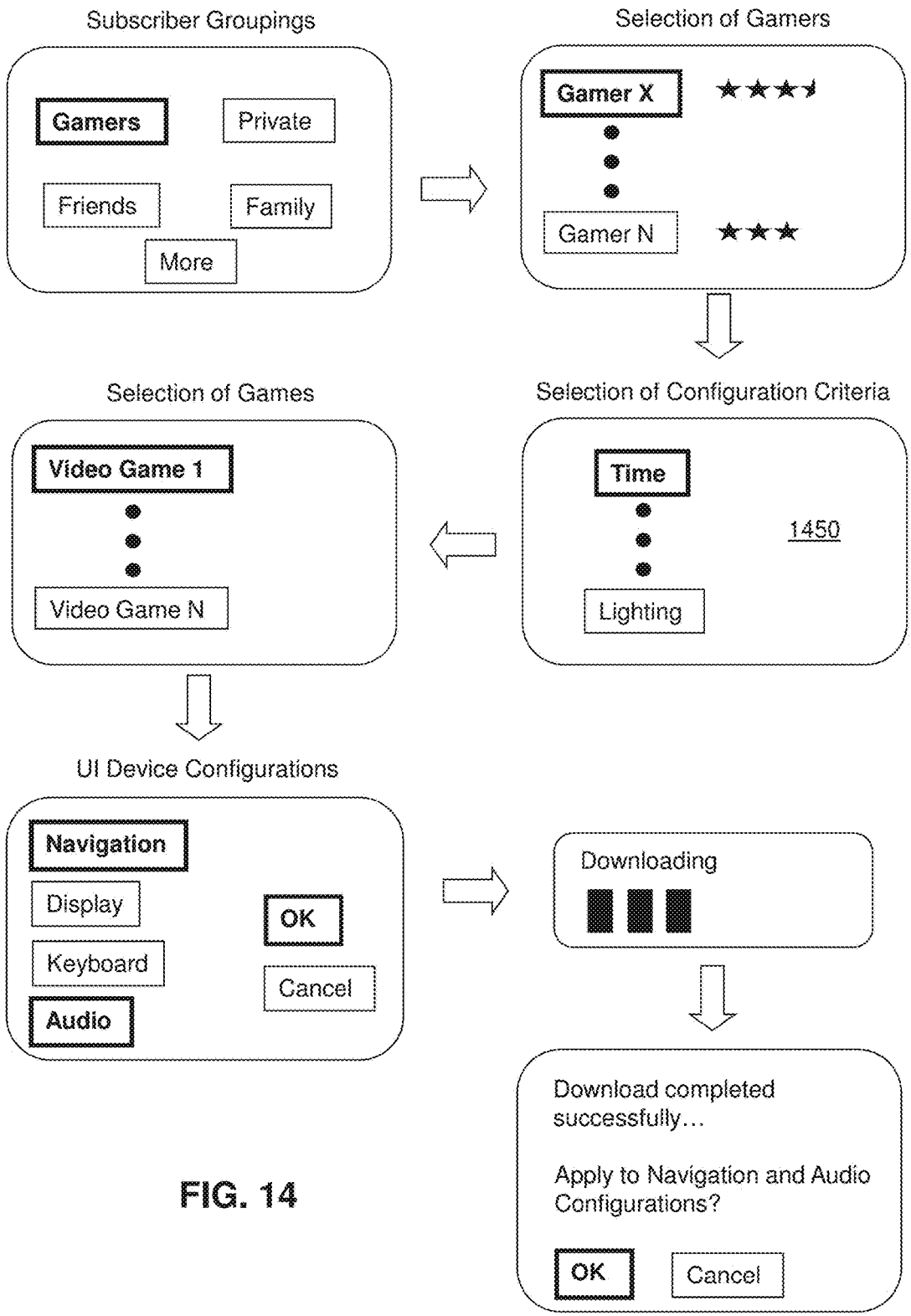
FIG. 14 depicts an embodiment of a graphical user interface illustrative of the method of FIG. 13.

The configuration criteria can be received, or otherwise accessed, in a number of different ways. For example, the requestor can include information in the request that is utilized for the configuration criteria, such as selecting criteria that can be utilized for the filtering of step 1316, including a location of the requestor, the time of day, the playing environment, temperature, humidity and so forth. As explained with respect to method 1100 and shown in system 1500 of FIG. 15, the requestor can access the available UI device configurations through use of the portal 1002. For instance, FIG. 14 illustrates a number of GUI windows that can be presented by a computing device 400 and used by a requestor when obtaining UI device configurations. One or more of the GUI windows can include a selection of configuration criteria, such as buttons 1450. The buttons 1450, or other selection techniques, can be utilized by the requestor to communicate configuration criteria to the web server 1550 or otherwise direct the web server to apply criteria for use in the filtering process.

In one embodiment, the buttons 1450 can be categories of criteria that are to be utilized by the web server 1550 in the filtering process, where the web server can obtain criteria data, such as through querying the requestor's computing device 400, based on the selected category of the criteria. For example, the requestor can select the "time" criteria category from the GUI window and the web server 1550 can query the computing device 400 for its local time. In another example, the requestor can select the "lighting" criteria category utilizing buttons 1450 and the web server 1550 can obtain lighting data associated with the requestor's computing device 400, such as accessing an image obtained by a camera coupled with the computing device 400. The data or other information associated with the selected categories can be obtained with or without the interaction, intervention or assistance of the requestor. For instance, a selection of the "lighting" category from the GUI can result in an image camera of the computing device 400 capturing an image automatically. The image can then be utilized for determining the lighting. In another embodiment, the requestor can provide information through use of the GUI that is utilized alone or with data automatically obtained by the web server 1550 from the computing device 400, such as allowing the requestor to input into the GUI whether the room is brightly lit and so forth.

In another embodiment, information associated with the request can be utilized to access configuration criteria, such as an identity of a requestor which is then utilized by the web server 1550 to determine that parental controls are applicable to the requestor. In one embodiment, additional information can be obtained that is utilized for selecting the applicable configuration criteria, such as accessing GPS coordinates associated with the computing device, or utilizing the determined location of the computing device to identify the temperature, humidity, time of day, and so forth. In another embodiment, user profiles associated with the requestor can be utilized that provide for configuration criteria.

In step 1320, the web server 1550 can receive a selection of the UI device configurations that were presented in the GUI. Based on the received selection, the web server can provide provisioning information to the computing device 400 so that the computing device can be configured with the selected UI device configuration.

Figure 15:
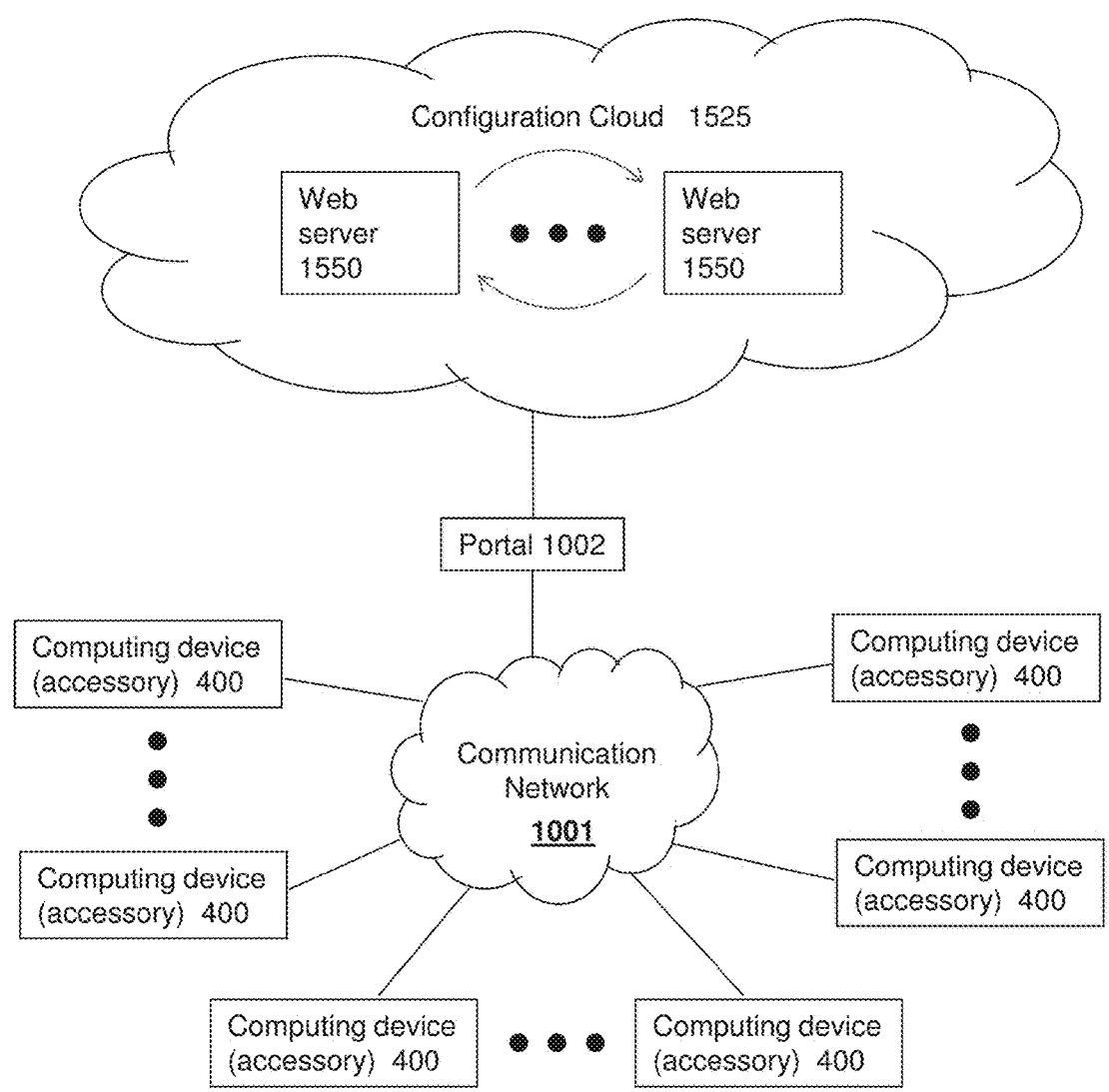
FIG. 15 depicts an illustrative embodiment of another communication system.

In one embodiment shown generally in system 1500 of FIG. 15, web server 1550 can be a plurality of web servers in a configuration cloud 1525. The cloud 1525 can provide computing devices 400 with UI device configurations such as over network 1001 through use of portal 1002. Cloud 1525 can operate by providing multilateral settings or configurations for various computing devices. For instance, a first web server 1550 can provide a host device, such as a desk top computer or a mobile phone, with first settings that are compatible with the host device. A second web server 1550 can provide a peripheral device, which is associated with the host device, with second settings (e.g., UI device configurations) that are compatible with the peripheral device and the host device to which the peripheral device is coupled. In this example, the peripheral device can include a processor for utilizing the UI device configurations as described in U.S. patent application Ser. No. 12/509,509 filed on Jul. 27, 2009, entitled "Device for Managing Operations of Accessories", the disclosure of which is hereby incorporated by reference. The first and the second servers 1550 can be in communication with each other to coordinate the providing of the settings. For example, the first and second servers 1550 can coordinate with each other to determine the group of host device settings and the compatible group of UI device configurations that are to be presented for selection to the requestor. After a selection is made, the provisioning of the host device and the peripheral device can further be coordinated to facilitate delivery of the settings to the host and peripheral devices, including coordinating a communication session for delivery.

In one embodiment, the configuration cloud 1525 can perform configuration matching between various web servers 1550 to facilitate the presentation of, and/or provisioning of, settings and UI device configurations for host and peripheral devices. In another embodiment, the web servers 1550 can be dedicated devices that are associated with different devices and/or groups of devices. For instance, a first web server 1550 can be dedicated to presenting and/or provisioning settings associated with XBOX® host devices while a second web server 1550 is dedicated to presenting and/or provisioning settings associated with PlayStation® host devices. In another embodiment, the web servers 1550 can be dedicated based on the type of software being executed by the host device, such as the operating system, and/or by the type of peripheral device being utilized by the host device, such as joysticks or keyboards. In another embodiment, the presenting and/or provisioning of the settings and UI device configurations can be performed by a plurality of web servers 1550, which may or may not be performed in parallel, to facilitate the process. The web servers 1550 can communicate directly with each other to facilitate the provisioning process and/or can communicate indirectly with each other, such as through a central server or through other web servers.

In one embodiment, the presentation and/or provisioning of settings and UI device configurations can be based on peripheral devices coupled with the host device. For example, web server 1550 can download first settings to a host device when it is detected or otherwise determined that the device, such as a mobile phone, does not have a peripheral device coupled thereto. Web server 1550 can download second settings and/or UI device configurations when it is detected or otherwise determined that the mobile phone device has a peripheral device coupled thereto. In this example, the type of peripheral device coupled with the mobile phone host device can be utilized as a factor in the selection of the second settings and/or UI device configurations from among a group of available settings and/or UI device configurations.

Figure 16:
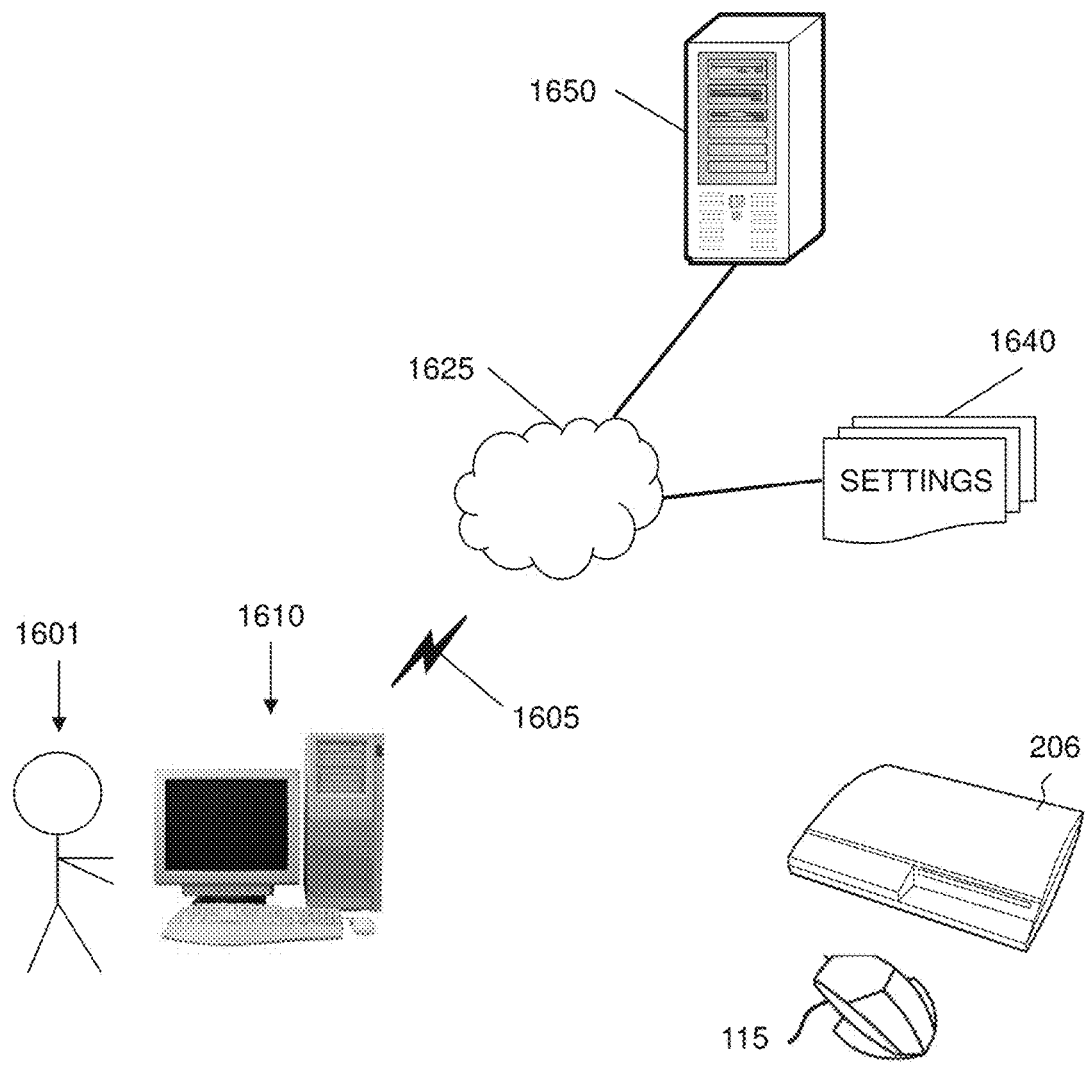
FIGS. 16-17 schematically illustrate configuring a computing device for use with a gaming application, according to an embodiment of the disclosure.

In accordance with embodiments of the disclosure, a gaming accessory can be configured while it is offline—for example, when the gaming accessory is not in communication with a host device and/or is not available to the user. FIG. 16 schematically illustrates an arrangement 1600 for configuring an offline gaming accessory (in this example, represented by mouse 115). As shown in FIG. 16, gaming accessory 115 and gaming computing device 206 are disconnected from each other and from the cloud 1625. User 1601 has access to computer 1610 for communicating with the cloud via a wireless connection 1605. (For example, computer 1610 might be at the user's work location while computing device 206 and gaming accessory 115 are at the user's home location, where the home and work locations are remote from each other.) In this embodiment, the AMS software can be available from remote server 1650, so that user 1601 can access the AMS software in the cloud from computer 1610. The AMS software may thus be viewed as a client of the remote server. In an embodiment, user 1601 downloads and installs the AMS software at computer 1610; in another embodiment, the user opens a virtual-machine session so that all the configuration operations are performed in the cloud.

The user can then use the AMS software to generate settings 1640 to configure the gaming accessory 115. In an embodiment, a configuration manager executing on server 1650 maintains a record of settings selected with the AMS software by the user. The settings 1640 are stored in the cloud 1625 so that they can be accessed at a later time from a different computer. The stored settings need not be applied to a particular device; for example, the settings can be independent of the type or the model of the accessory. In an embodiment, the settings 1640 can be used to configure any of several different models or types of accessories.

Figure 17:
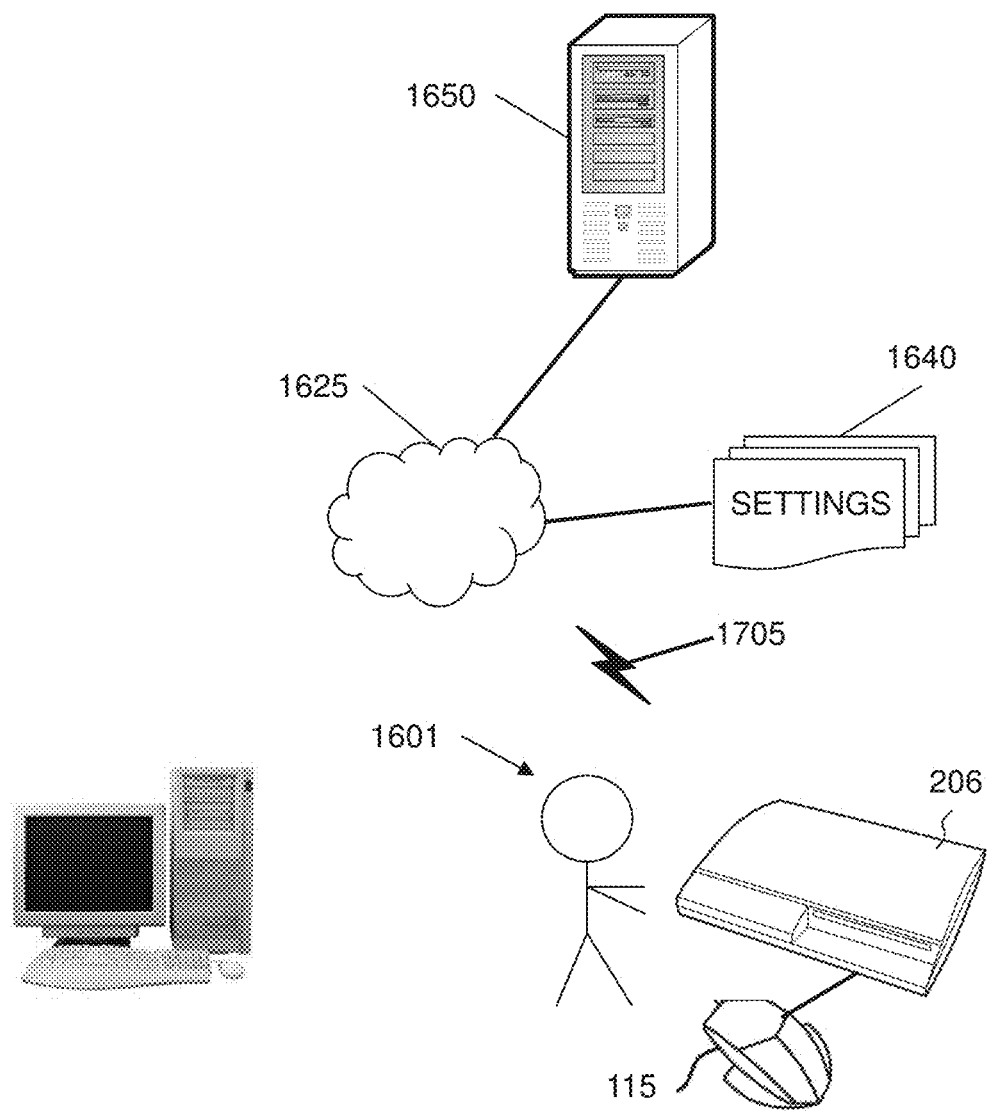

FIG. 17 schematically illustrates an arrangement 1700 in which user 1601 initiates an online gaming session. Gaming computing device 206 communicates with the cloud 1625 via a wireless connection 1705, and acts as a host device for gaming accessory 115. The settings 1640 in cloud storage can then be automatically loaded onto the gaming accessory 115. In an embodiment, the configuration manager on server 1650 can evaluate time stamps associated with the settings 1640 and settings stored locally at the computing device 206 or the gaming accessory 115, to ensure that the gaming accessory is loaded with the most recent settings. In a case where a setting stored in the cloud and a locally stored setting correspond to the same operating parameter for a given game, the setting with the latest time stamp is included in the configuration. In an embodiment, the gaming accessory 115 can have a different file of settings 1640 stored in the cloud for each game played by the user, so that the accessory can be automatically loaded with a different configuration for each game. The user 1601 then can initiate a new game using host computing device 206 without needing to change any accessory settings when moving from one game to another.

Figure 18:
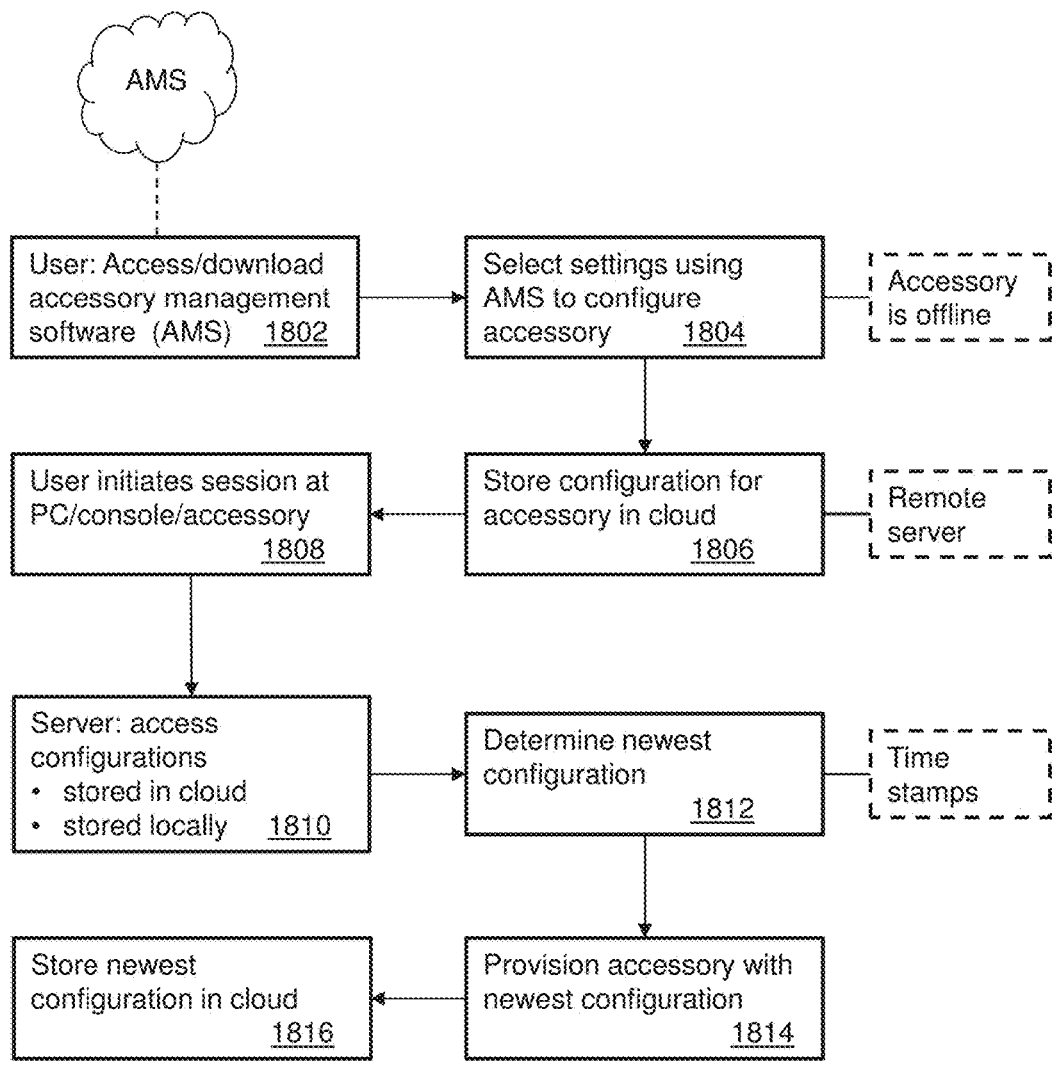
FIG. 18 is a flowchart illustrating a method for provisioning a computing device as a gaming accessory, in accordance with an embodiment of the disclosure.

FIG. 18 is a flowchart showing steps in a method 1800 for offline configuration of a gaming accessory, in accordance with embodiments of the disclosure. In step 1802, the user accesses the AMS software from a computing device remote from the accessory and the host device. The AMS software can be stored on a remote server and accessed via the cloud. The user then selects settings (step 1804) for configuring the gaming accessory. The gaming accessory is generally remote from the user and not in communication with either the computing device of the user or the cloud. The selected settings, which comprise a configuration for the gaming accessory, are stored in the cloud (step 1806). In an embodiment, storage and management of the accessory configurations can be performed at a remote server, which can also be a server for the AMS software.

The user initiates a gaming session (step 1808) at a computing device that acts as the host device for the accessory. In general, this computing device is remote from the computer used to select the settings. The server then accesses settings for the accessory and for the game that comprise a configuration of the gaming accessory for that game (step 1810). The configuration can be stored in the cloud, stored locally (for example, at a storage component of computing device 206), or a combination of the two. The server determines which settings are the most recent, to determine the newest configuration for the accessory for the game selected by the user (step 1812). In an embodiment, this is done by evaluating time stamps associated with each of the settings. This ensures that the gaming accessory receives the newest configuration, independently of its storage location.

The gaming accessory is then provisioned with the newest configuration for the selected game (step 1814). This configuration is also stored in the cloud (step 1816) and may be stored locally at the host computing device and/or the accessory.

Figure 19:
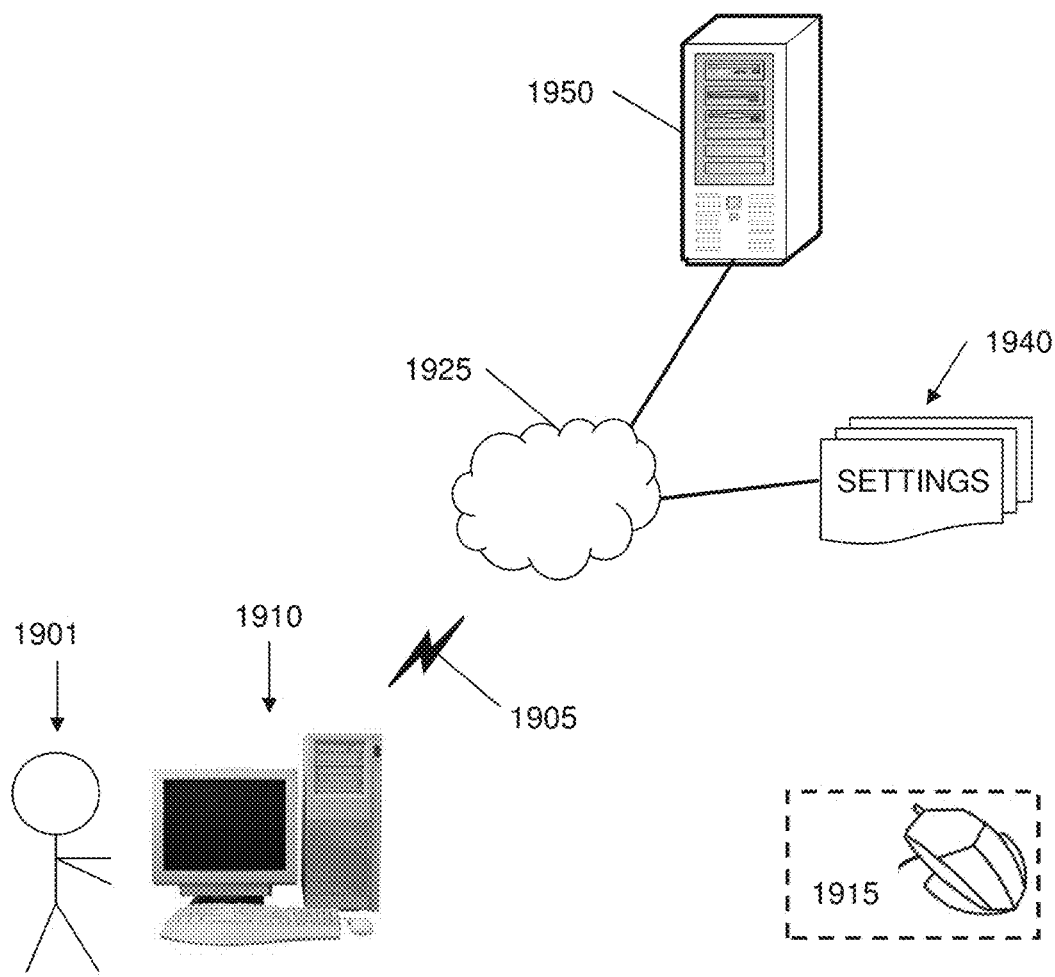
FIGS. 19-20 schematically illustrate configuring a computing device for use with a gaming application, according to another embodiment of the disclosure.

FIG. 19 schematically illustrates an arrangement 1900 for configuring a gaming accessory (in this example, represented by mouse 1915), where the configuring is performed before the accessory is delivered to the user. As shown in FIG. 19, user 1901 is remote from accessory 1915; in an embodiment, user 1901 can configure the accessory before the accessory is manufactured. User 1901 has access to computer 1910 for communicating with the cloud 1925 via a wireless connection 1905. In an embodiment, user 1901 purchases accessory 1915 via an e-commerce service accessible through the cloud 1925, and configures the accessory at the time of purchase. In this embodiment, the AMS software is available from remote server 1950, so that user 1901 can access the AMS software in the cloud from computer 1910. In an embodiment, user 1901 downloads and installs the AMS software at computer 1910; in another embodiment, the user opens a virtual-machine session so that all the configuration operations are performed in the cloud.

The user can then use the AMS software to generate settings 1940 to configure the gaming accessory 1915. In the embodiment shown in FIG. 19, user 1901 chooses settings for the new accessory 1915 by accessing the AMS software at computer 1910. At this point, the accessory 1915 is not yet in the user's possession, and the computer 1910 may or may not be the device typically used for a gaming session. The user 1901 may choose settings for the accessory in a variety of ways. In an embodiment, the user 1901 is presented with a simulator at the computer 1910, and can utilize the simulator in order to choose suitable settings. In an embodiment, a configuration manager executing on server 1950 maintains a record of settings selected with the AMS software by the user. The settings 1940 are stored in the cloud 1925.

Figure 20:
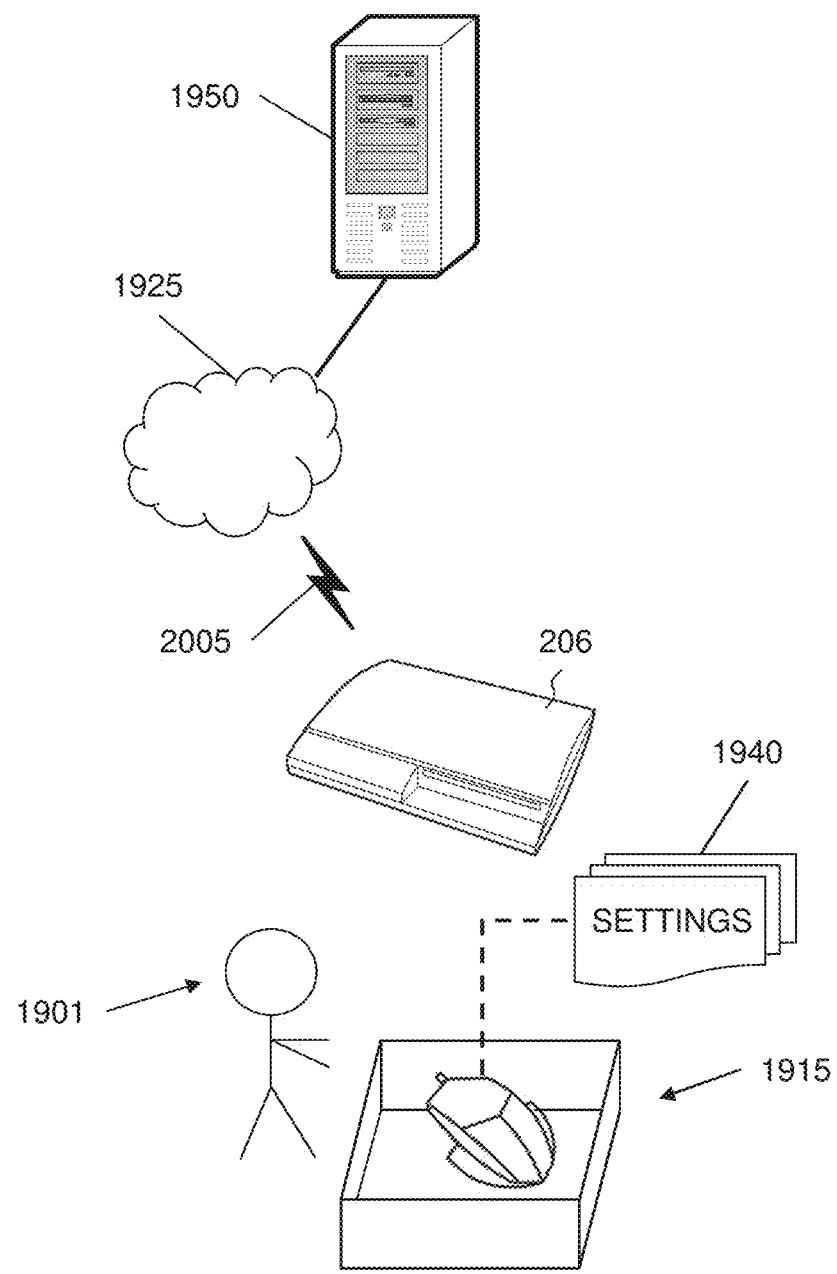

FIG. 20 schematically illustrates the experience of user 1901 upon receiving delivery of accessory 1915 (sometimes called the user's "unboxing experience"). In an embodiment, the accessory 1915 can include a memory that has been pre-programmed with settings 1940. The accessory 1915 can be communicatively coupled to computing device 206 by way of a wireless or tethered interface. Note that computing device 206 can represent a gaming console, a desktop computer, a laptop computer, or any other suitable computing device. Additionally, accessory 1915 can be a mouse (as shown), a gaming controller 115 such as shown in FIG. 1, or any other suitable accessory. Accordingly, the accessory 115 and computing device 206 shown in FIG. 20 are for illustration purposes only and are therefore non-limiting to the subject disclosure. With this in mind, the AMS software can be downloaded to the computing device 206 if it has not been previously downloaded thereto. Upon communicatively coupling the accessory 1915 to the computing device 206, the AMS software can communicate with cloud 1925 over an internet connection to compare one or more timestamps associated with settings stored in the pre-programmed memory of the accessory 1915 to one or more timestamps stored in the cloud 1925 for settings 1940. From the comparison of timestamps and/or other comparative factors (such as the settings themselves), the AMS software (or a server in cloud 1925) can determine that the settings stored in the pre-programmed memory are in fact synchronized to settings 1940 stored in the cloud 1925. The accessory 1915 is thus ready to be used immediately with gaming computing device 206 without user input from user 1901. The foregoing process for verifying that the accessory 1915 has settings synchronized with the cloud 1925 can be performed promptly without user input thereby providing user 1901 a satisfying unboxing experience.

In an embodiment where a memory of the accessory 1915 is not pre-programmed with settings 1940 stored in the cloud 1925 (and/or accessory 1915 is programmed with factory default settings), the AMS software can configured to detect that settings stored in the pre-programmed memory are not synchronized to settings 1940 stored in the cloud 1925 utilizing the process of comparing timestamps and/or other parametric data as previously described. Upon detecting that the settings of the accessory 1915 are not synchronized, the AMS software can be configured to download settings 1940 from the cloud 1925 and program such settings in the memory of the accessory 1915. As before, this process can be performed promptly without user input thereby providing user 1901 a satisfying unboxing experience. In either of the foregoing embodiments, the user can initiate an online gaming session in which device 206 communicates (via wireless connection 2005) with other users' devices over the internet. In this embodiment, the user 1901 can use accessory 1915 without having to enter or change any settings at the accessory 1915.

It is further noted that accessory 1915 can be used for games locally executed by the computing device 206 that do not require an internet connection. In such instances, user 1901 can make changes to settings locally stored in the memory of accessory 1915. User 1901 can create a profile that is specifically associated with a local game. When an internet connection is made available to the AMS software, the AMS software can compare the new profile and corresponding settings to other profiles stored in the cloud 1925. Upon detecting that the new profile is not stored in the cloud 1925, the AMS software can be directed to upload the new settings to cloud 1925. The foregoing embodiments illustrate that synchronization can take place from the accessory 1915 to the cloud 1925 or from the cloud 1925 to the accessory 1915 depending on which of the accessory 1915 or the cloud 1925 has the more current settings. It is also noted that user 1901 may own or otherwise have access to multiple accessories 1915. When the user 1901 switches to a different accessory that has not been programmed with settings currently stored in cloud 1925, the AMS software will detect a lack of synchronization with settings stored in the different accessory and either upload settings from the different accessory to the cloud 1925 (if the settings in the different accessory have not been previously stored in the cloud 1925), download settings from the cloud 1925 to the different accessory (if the accessory is missing settings that have been added to the cloud 1925), or both if there are new settings in both the different accessory and the cloud 1925.

It is further noted that user 1901 may have several accessories at his/her disposal that may belong to user 1902 or that may be borrowed from other users. A computing device, such as reference 206, executing an AMS software application can enable user 1901 to synchronize any accessory 1915 utilized by user 1901 with settings stored in the cloud 1925 under an account of the user 1901. The AMS software application, for example, can present user 1901 a login screen to log into his/her account in cloud 1925 to gain access to settings 1940 belonging to user 1901. Accordingly, user 1901 can utilize any accessory 1915 with any computing device 206, whether it belongs to user 1901 or to another user, and program the accessory 1915 with settings particular to user 1901 by synchronizing settings in the accessory 1915 to the cloud 1925. In a multiuser environment, several users can log into their respective accounts in cloud 1925 via the AMS software to download settings to their respective accessories and thereby to engage in a gaming session with personalized settings. Accordingly, the embodiments described above can be adapted to enable users to share accessories 1915 and/or computing devices 206 (and/or bring their own accessory), and extract settings from the cloud 1925 to personalize the accessory to each user's preference. The foregoing embodiments can be utilized at any location and with any accessory and/or computing device.

It is also noted that the settings of an accessory 1915 can be stored in whole at the accessory 1915 and obtained and used by a processor of the accessory 1915 locally, or can be stored in part in a memory of the accessory 1915 and in part utilized for configuring an operating system of the computing device 206. It may also be noted that the AMS software can be executed in whole by the computing device 206 as previously described, or can be executed in part by the accessory 1915 and in part by the computing device 206, or can be executed in whole or in part by an on-line gaming system, or can be executed in whole or in part by the cloud 1925, or can be executed or can be executed in whole by the accessory 1915. The embodiments of the subject disclosure can be adapted with any of the foregoing storage configurations for accessory settings and/or any of the foregoing execution configurations of the AMS software. It is further noted that cloud 1925 can represent one or more servers coupled to one or more storage devices that are remotely accessible by way of the internet or other communication networks.

Figure 21:
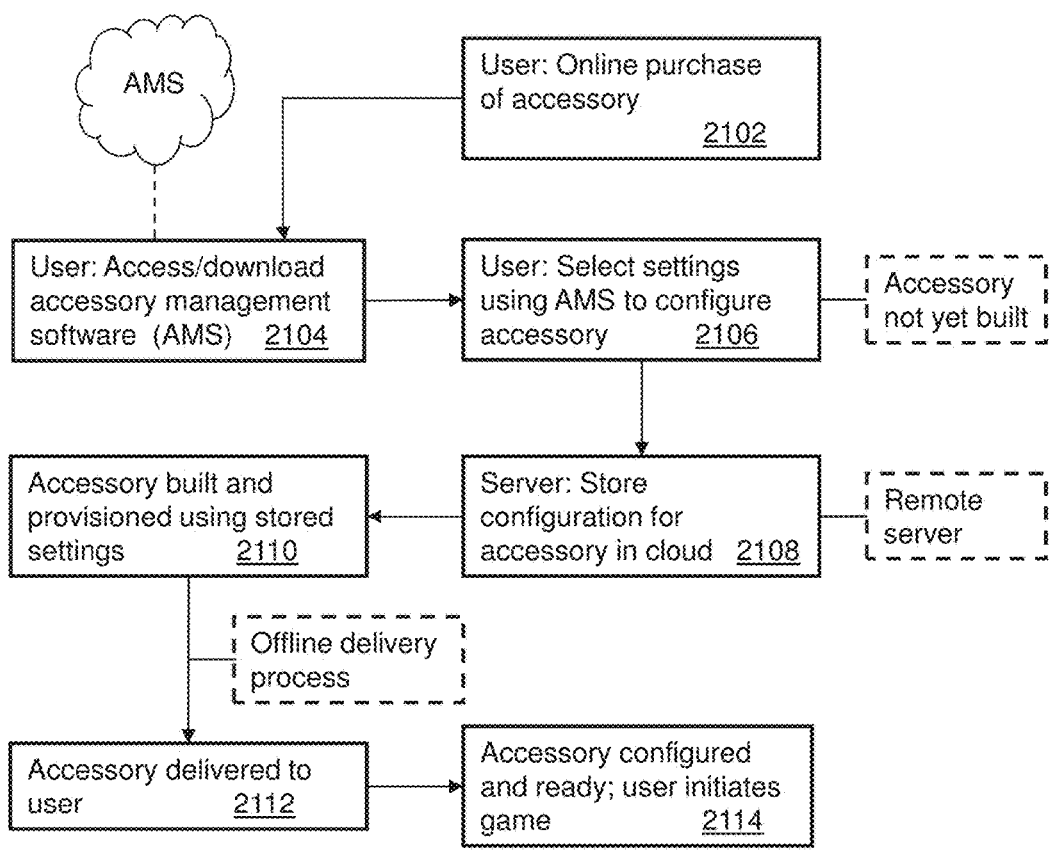
FIG. 21 is a flowchart illustrating a method for provisioning a computing device as a gaming accessory, in accordance with another embodiment of the disclosure.

FIG. 21 is a flowchart showing steps in a method 2100 for offline configuration of a gaming accessory, in accordance with embodiments of the disclosure. In step 2102, the user makes an online purchase of a gaming accessory at a local computing device. The user then accesses the AMS software (step 2104) to configure the accessory; in an embodiment, this is done as part of the purchasing process. The AMS software can be stored on a remote server and accessed via the cloud. The user then selects settings (step 2106) for configuring the gaming accessory. The gaming accessory is generally not available to the user at this point; in an embodiment, the accessory has not yet been manufactured. The selected settings, which comprise a configuration for the gaming accessory, are stored in the cloud (step 2108). In an embodiment, storage and management of the accessory configurations can be performed at a remote server, which can also be a server for the AMS software.

The accessory is provisioned with the selected settings that have been stored in the cloud (step 2110). The accessory is then delivered to the user (step 2112). The user can initiate a game (step 2114) without having to enter or change any settings of the accessory.

Figure 22:
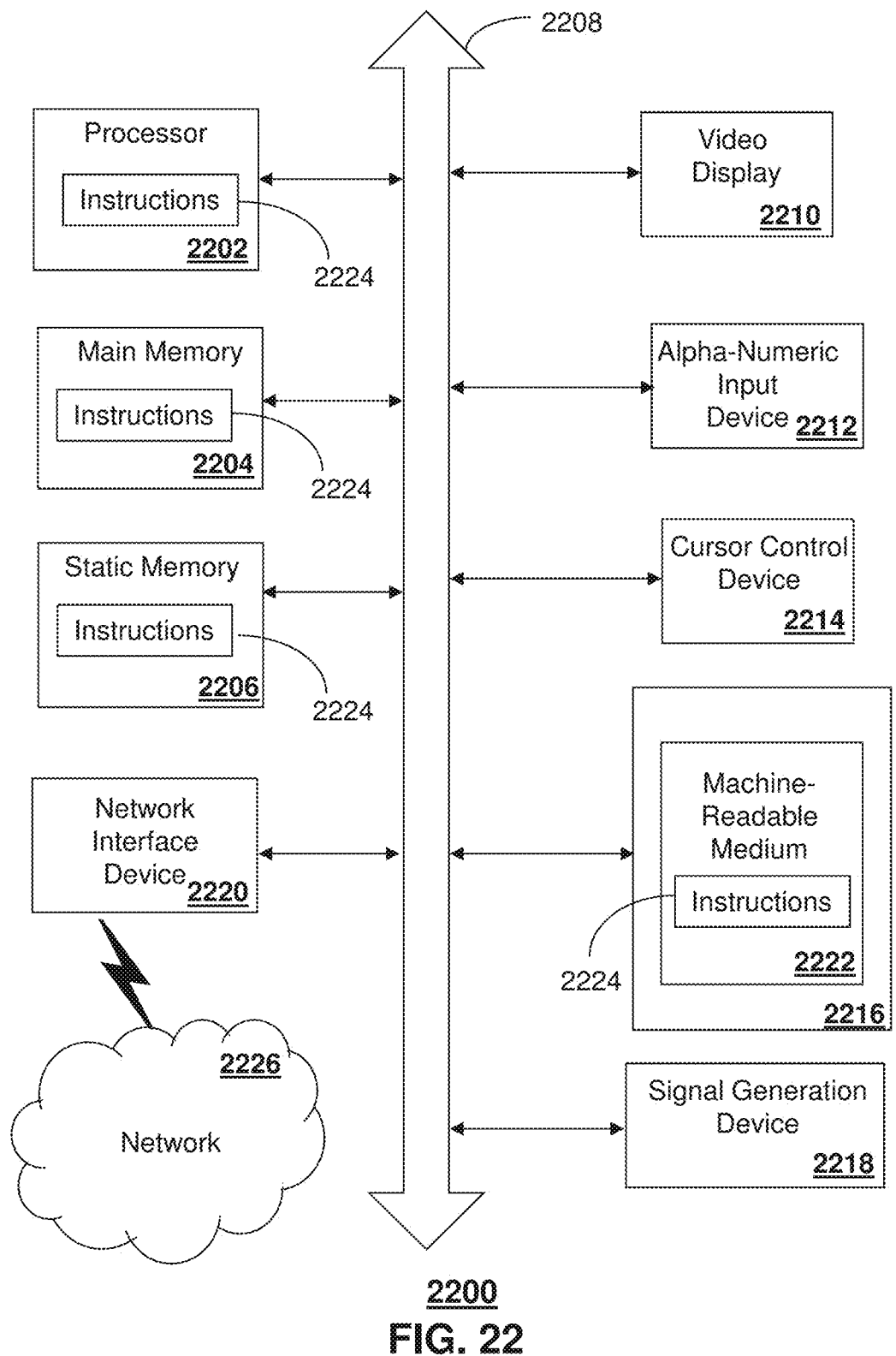
FIG. 22 depicts an illustrative diagrammatic representation of a machine in the form of a computer system within which a set of instructions, when executed, may cause the machine to perform any one or more of the methodologies disclosed herein.

FIG. 22 depicts an exemplary diagrammatic representation of a machine in the form of a computer system 2200 within which a set of instructions, when executed, may cause the machine to perform any one or more of the methods described above. One or more instances of the machine can operate, for example, as an accessory, computing device or combinations thereof. In some embodiments, the machine may be connected (e.g., using a network 2226) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 2200 may include a processor (or controller) 2202 (e.g., a central processing unit (CPU)), a graphics processing unit (GPU, or both), a main memory 2204 and a static memory 2206, which communicate with each other via a bus 2208. The computer system 2200 may further include a display unit 2210 (e.g., a liquid crystal display (LCD), a flat panel, or a solid state display). The computer system 2200 may include an input device 2212 (e.g., a keyboard), a cursor control device 2214 (e.g., a mouse), a disk drive unit 2216, a signal generation device 2218 (e.g., a speaker or remote control) and a network interface device 2220. In distributed environments, the embodiments described in the subject disclosure can be adapted to utilize multiple display units 2210 controlled by two or more computer systems 2200. In this configuration, presentations described by the subject disclosure may in part be shown in a first of the display units 2210, while the remaining portion is presented in a second of the display units 2210.

The disk drive unit 2216 may include a tangible computer-readable storage medium 2222 on which is stored one or more sets of instructions (e.g., software 2224) embodying any one or more of the methods or functions described herein, including those methods illustrated above. The instructions 2224 may also reside, completely or at least partially, within the main memory 2204, the static memory 2206, and/or within the processor 2202 during execution thereof by the computer system 2200. The main memory 2204 and the processor 2202 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 2222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 2200.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

It will be appreciated that fewer than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   storing, by a system including a processing system including a processor, configuration information received from user equipment in a memory accessible to the system, wherein the configuration information is for a peripheral device, wherein during receipt of the configuration information the peripheral device is not in communication with the user equipment, wherein the configuration information, is based on selections obtained via the user equipment, associated with operational parameters for the peripheral device, and wherein the memory is remote from the user equipment; and
   providing, by the system, provisioning information to the user equipment, wherein the provisioning information is associated with the configuration information and wherein the provisioning information enables configuration of the peripheral device with the operational parameters.

2. The method of claim 1, further comprising receiving, by the system, the configuration information, and wherein the configuration information is received over a network from the user equipment.

3. The method of claim 2, further comprising detecting the peripheral device, wherein the user equipment comprises a first computing device and a second computing device that are remote from each other and are associated with a user, wherein the receiving of the configuration information over the network is from the first computing device, wherein the detecting of the peripheral device is by the second computing device, and wherein the providing of the provisioning information is to the second computing device.

4. The method of claim 2, wherein the receiving of the configuration information is in association with a purchase of the peripheral device via the user equipment.

5. The method of claim 1, wherein the providing the provisioning information to the user equipment comprises providing the provisioning information to the user equipment via a network.

6. The method of claim 1, further comprising receiving, by the system, from the user equipment a configuration request, wherein the configuration request is received from the user equipment responsive to the user equipment detecting the peripheral device, and wherein the providing the provisioning information to the user equipment responsive to the user equipment detecting the peripheral device comprises providing the provisioning information to the user equipment responsive to the configuration request.

7. The method of claim 1, further comprising providing, by the system, to the user equipment, over a network, a graphical user interface for presentation by the user equipment, wherein the selections associated with the operational parameters for the peripheral device comprise selections of options presented by the graphical user interface in an Internet browser of the user equipment.

8. The method of claim 7, wherein the graphical user interface presents a simulation of the operational parameters for the peripheral device for the options and wherein the peripheral device is a gaming accessory.

9. A non-transitory, computer-readable storage medium comprising computer instructions which, responsive to being executed by a processing system including a processor, facilitate performance of operations, the operations comprising:
 storing configuration information from user equipment in a memory accessible to the processing system, wherein the configuration information is for a peripheral device, wherein during a receipt of the configuration information the peripheral device is not connected with and is not in communication with the user equipment, wherein the configuration information had been generated according to user input at the user equipment, wherein the user input comprises selections associated with operational parameters for the peripheral device, and wherein the memory is remote from the user equipment; and
 providing configuration information to the user equipment, wherein the configuration information facilitates configuration of the peripheral device with the operational parameters.

10. The non-transitory, computer-readable storage medium of claim 9, wherein the operations further comprise receiving the configuration information, and wherein the configuration information is received over a network from the user equipment.

11. The non-transitory, computer-readable storage medium of claim 10, wherein the operations further comprising detecting the peripheral device, wherein the user equipment comprises a first computing device and a second computing device that are remote from each other and are associated with a user, wherein the receiving of the configuration information over the network is from the first computing device, wherein the detecting of the peripheral device is by the second computing device, and wherein the providing of the configuration information is to the second computing device.

12. The non-transitory, computer-readable storage medium of claim 9, wherein the operations further comprise providing to the user equipment, over a network, a graphical user interface for presentation by the user equipment, wherein the selections associated with the operational parameters for the peripheral device comprise selections of options presented by the graphical user interface in an Internet browser of the user equipment.

13. The non-transitory, computer-readable storage medium of claim 12, wherein the graphical user interface presents a simulation of the operational parameters for the peripheral device for the options and wherein the peripheral device is a gaming accessory.

14. A peripheral device comprising:
 a memory that stores instructions; and
 a processing system including a processor coupled with the memory, wherein the processing system, responsive to executing the instructions, facilitates performance of operations, the operations comprising:
  obtaining configuration information from user equipment, wherein the configuration information is for the peripheral device, wherein during receipt of the configuration information the peripheral device is not in communication with the user equipment, wherein the configuration information is based on selections obtained via the user equipment and associated with operational parameters for the peripheral device;
  storing the configuration information in the memory, wherein the memory is remote from the user equipment; and
  providing provisioning information to the user equipment, wherein the provisioning information is associated with the configuration information and wherein the provisioning information enables configuration of the peripheral device with the operational parameters.

15. The peripheral device of claim 14, wherein the operations further comprise receiving the configuration information, and wherein the configuration information is received over a network from the user equipment.

16. The peripheral device of claim 15, wherein the operations further comprising detecting the peripheral device, wherein the user equipment comprises a first computing device and a second computing device that are remote from each other and are associated with a user, wherein the receiving of the configuration information over the network is from the first computing device, wherein the detecting of the peripheral device is by the second computing device, and wherein the providing of the provisioning information is to the second computing device.

17. The peripheral device of claim 15, wherein the receiving of the configuration information is in association with a purchase of the peripheral device via the user equipment.

18. The peripheral device of claim 14, wherein the providing the provisioning information to the user equipment comprises providing the provisioning information to the user equipment via a network.

19. The peripheral device of claim 14, wherein the operations further comprise obtaining from the user equipment a configuration request, wherein the configuration request is received from the user equipment responsive to the user equipment detecting the peripheral device, and wherein the providing the provisioning information to the user equipment responsive to the user equipment detecting the peripheral device comprises providing the provisioning information to the user equipment responsive to the configuration request.

20. The peripheral device of claim 14, wherein the operations further comprise providing to the user equipment, over a network, a graphical user interface for presentation by the user equipment, wherein the selections associated with the operational parameters for the peripheral device comprise selections of options presented by the graphical user interface in an Internet browser of the user equipment.

\* \* \* \* \*